US012651998B1

(12) United States Patent
Allen

(10) Patent No.: US 12,651,998 B1
(45) Date of Patent: Jun. 9, 2026

(54) SYSTEMS AND METHODS FOR DIRECTING LIGHT TOWARDS A SOLAR CELL

(71) Applicant: Amazon Technologies, Inc., Seattle, WA (US)

(72) Inventor: Dan Gilbert Allen, Springville, UT (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 18/236,521

(22) Filed: Aug. 22, 2023

(51) Int. Cl.
| | |
|---|---|
| *H02S 20/20* | (2014.01) |
| *G02B 1/11* | (2015.01) |
| *G02B 26/08* | (2006.01) |
| *H02S 40/22* | (2014.01) |
| *H02S 40/38* | (2014.01) |
| *H02S 40/40* | (2014.01) |

(52) U.S. Cl.
CPC ............... *H02S 40/22* (2014.12); *G02B 1/11* (2013.01); *G02B 26/0816* (2013.01); *H02S 20/20* (2014.12); *H02S 40/38* (2014.12); *H02S 40/40* (2014.12)

(58) Field of Classification Search
CPC .......... H02S 40/22; H02S 40/38; H02S 40/40; H02S 20/20; G02B 1/11; G02B 26/0816
See application file for complete search history.

(56) References Cited

U.S. PATENT DOCUMENTS

| | | | |
|---|---|---|---|
| 5,428,388 A | 6/1995 | von Bauer et al. | |
| 11,588,425 B1 * | 2/2023 | Blair .................... | G02B 7/1821 |
| 12,170,502 B1 * | 12/2024 | Padmanaban .......... | H02S 20/32 |
| 2007/0008081 A1 | 1/2007 | Tylicki et al. | |
| 2010/0225455 A1 | 9/2010 | Claiborne et al. | |
| 2010/0252024 A1 * | 10/2010 | Convery ................ | F24S 50/20 |
| | | | 126/578 |
| 2014/0267716 A1 | 9/2014 | Child et al. | |
| 2015/0050031 A1 * | 2/2015 | Violante ................ | H02J 50/30 |
| | | | 398/200 |
| 2015/0163463 A1 | 6/2015 | Hwang et al. | |
| 2016/0226437 A1 * | 8/2016 | Tamaura ................ | F24S 50/20 |

* cited by examiner

*Primary Examiner* — Mark A Connolly
(74) *Attorney, Agent, or Firm* — Eversheds Sutherland (US) LLP

(57) ABSTRACT

A device includes a first solar cell, a mirror configured to direct light towards a second solar cell of an additional device, and one or more motors configured to adjust an orientation of the mirror. The device actuates the mirror to a first orientation and receive, from the additional device, a first signal associated with a first intensity of the light received by the second solar cell at the first orientation of the mirror. Based at least in part on the first signal, the device actuates the mirror to a second orientation. The device further receives, from the second device, a second signal associated with a second intensity of the light received by the second solar cell at the second orientation of the mirror, and causes, based at least in part on the second signal, the one or more motors to actuate the mirror to a third orientation.

25 Claims, 23 Drawing Sheets

108

110

400

402

404

106

406

204

408

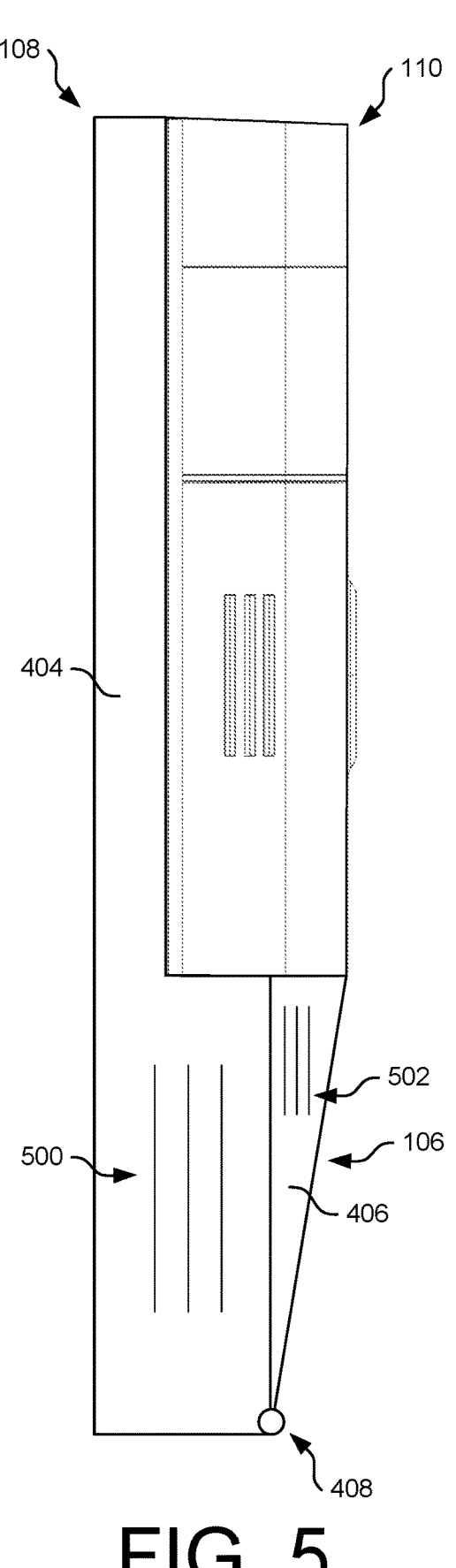
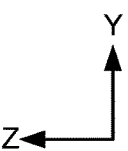
FIG. 5

110

106

406

408

204

Y

X

108

702(1)

702(2)

704

706

708

700

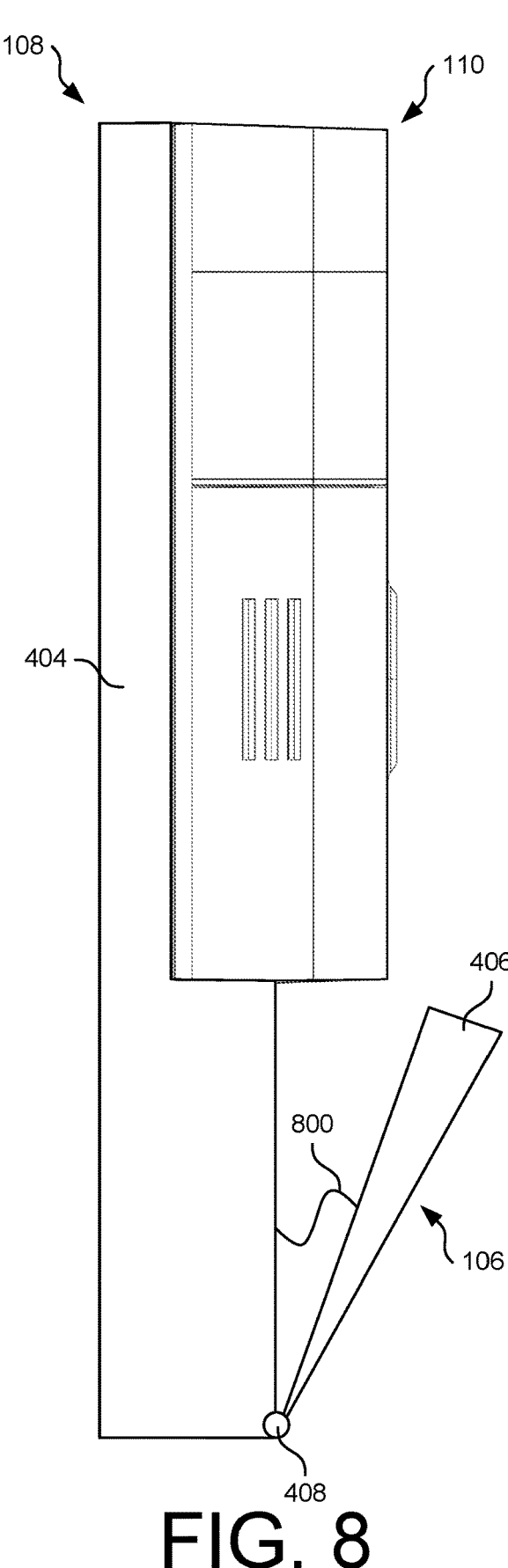
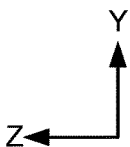
FIG. 8

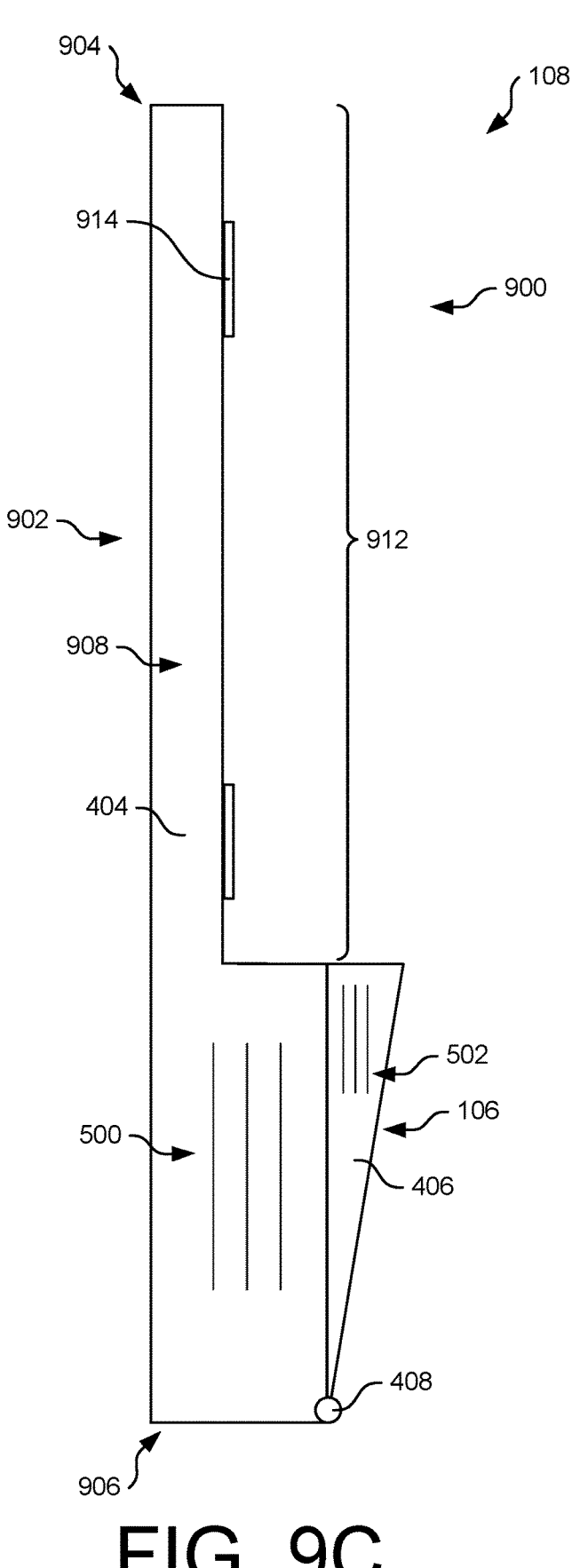
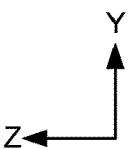
FIG. 9C

102

112

310

1004

312

1002

1006

1000

1012

306

1010

102

1002

112

1006

1004

1008

1000

1012

306

1010

102

112
310

1002

1004

312

1012

1000

306

1010

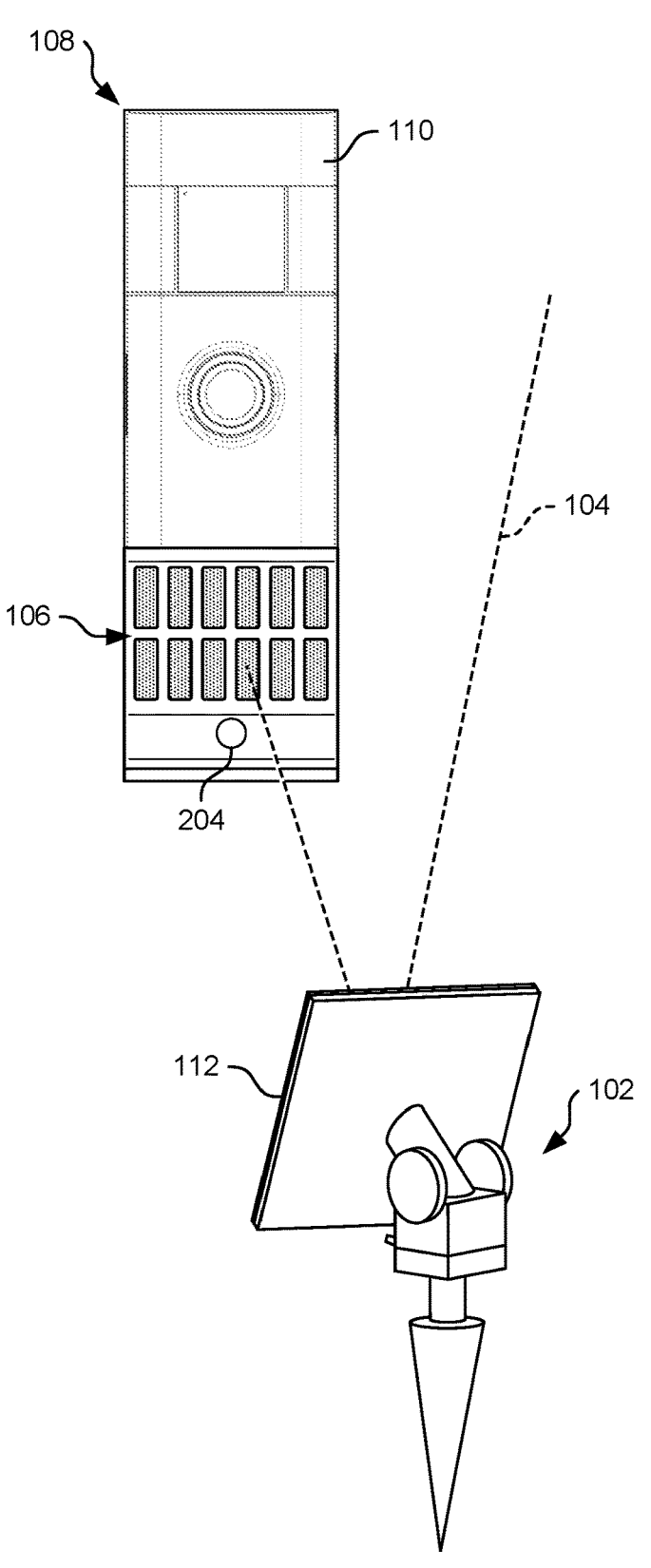
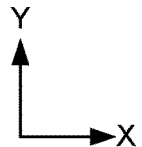
FIG. 12A

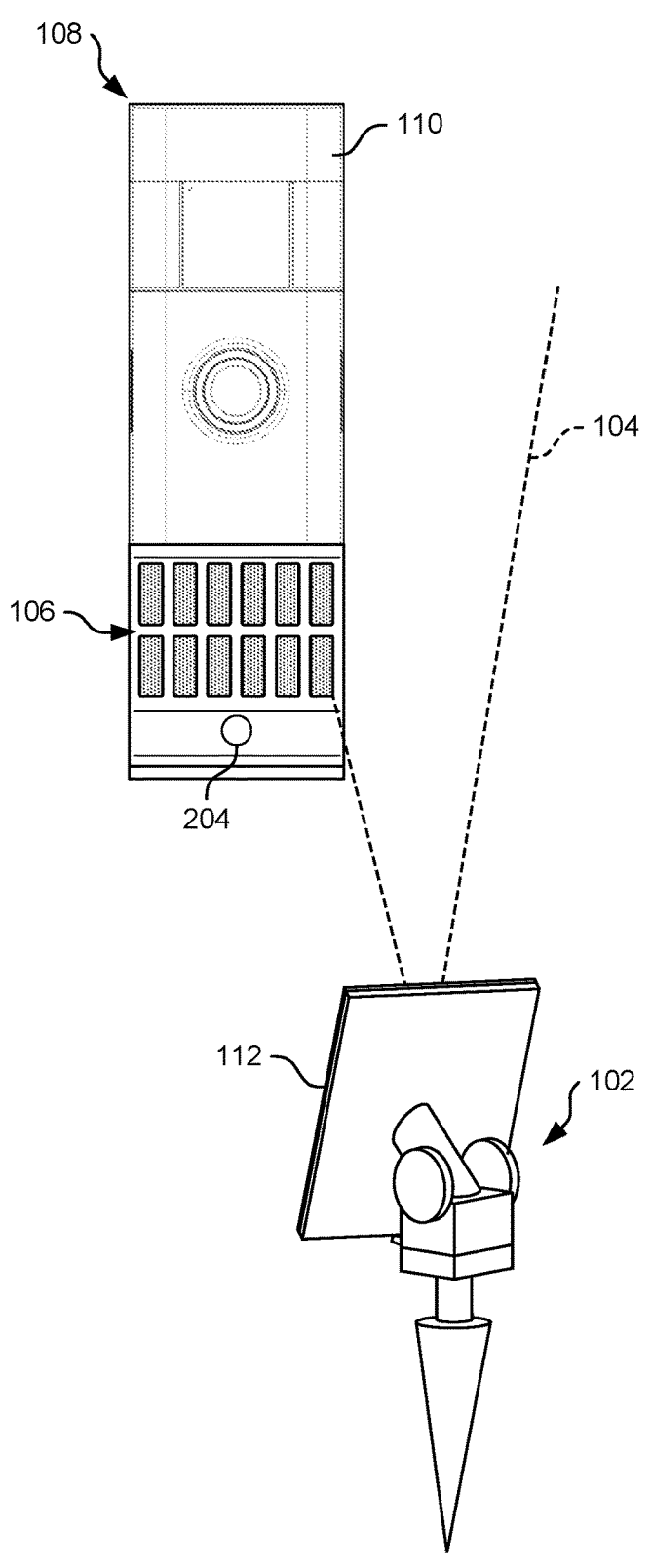
FIG. 12B
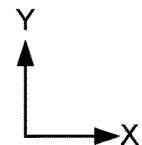

1400

RECEIVE FIRST DATA ASSOCIATED WITH A FIRST INTENSITY OF LIGHT RECEIVED BY A SOLAR CELL 1402

SEND SECOND DATA ASSOCIATED WITH THE FIRST INTENSITY OF LIGHT 1404

RECEIVE THIRD DATA ASSOCIATED WITH A SECOND INTENSITY OF LIGHT RECEIVED BY THE SOLAR CELL 1406

SEND FOURTH DATA ASSOCIATED WITH THE SECOND INTENSITY OF LIGHT 1408

CAUSE A BATTERY OF A DEVICE TO BE CHARGED 1410

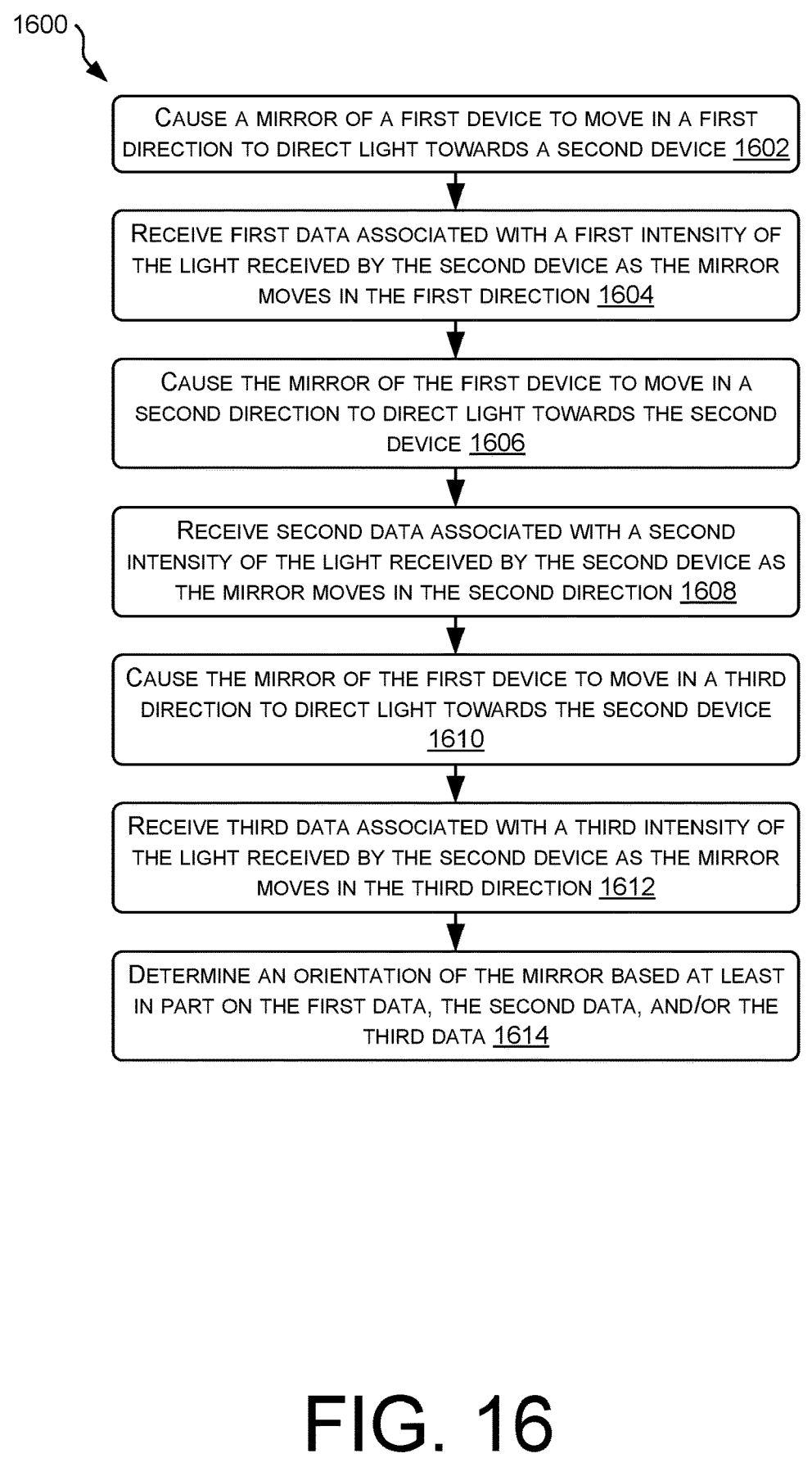

1600

CAUSE A MIRROR OF A FIRST DEVICE TO MOVE IN A FIRST DIRECTION TO DIRECT LIGHT TOWARDS A SECOND DEVICE 1602

RECEIVE FIRST DATA ASSOCIATED WITH A FIRST INTENSITY OF THE LIGHT RECEIVED BY THE SECOND DEVICE AS THE MIRROR MOVES IN THE FIRST DIRECTION 1604

CAUSE THE MIRROR OF THE FIRST DEVICE TO MOVE IN A SECOND DIRECTION TO DIRECT LIGHT TOWARDS THE SECOND DEVICE 1606

RECEIVE SECOND DATA ASSOCIATED WITH A SECOND INTENSITY OF THE LIGHT RECEIVED BY THE SECOND DEVICE AS THE MIRROR MOVES IN THE SECOND DIRECTION 1608

CAUSE THE MIRROR OF THE FIRST DEVICE TO MOVE IN A THIRD DIRECTION TO DIRECT LIGHT TOWARDS THE SECOND DEVICE 1610

RECEIVE THIRD DATA ASSOCIATED WITH A THIRD INTENSITY OF THE LIGHT RECEIVED BY THE SECOND DEVICE AS THE MIRROR MOVES IN THE THIRD DIRECTION 1612

DETERMINE AN ORIENTATION OF THE MIRROR BASED AT LEAST IN PART ON THE FIRST DATA, THE SECOND DATA, AND/OR THE THIRD DATA 1614

FIG. 16

SYSTEMS AND METHODS FOR DIRECTING LIGHT TOWARDS A SOLAR CELL

BACKGROUND

Camera devices, such as security camera devices and video doorbell devices, are increasingly ubiquitous. Many camera devices are powered by a battery, without any connection to line power. In some instances, a solar panel accessory device may be used to facilitate powering a camera device. However, conventional devices may have limited battery life, large form factors, and/or not be aesthetically appealing. Additionally, with an increase in camera resolution and/or device capabilities, batteries may be depleted at faster rates. In such instances, the devices may fail to accurately warn homeowners, businesses, and the like of imminent threats, such as detecting intruders or unwelcomed guests.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

FIG. 5 illustrates a side view of the device disposed on the mount of FIG. 1, according to examples of the present disclosure.

FIG. 8 illustrates a hinged coupling of the solar cell of the mount of FIG. 1, according to examples of the present disclosure.

FIGS. 9A-9C illustrate the mount of FIG. 1, according to examples of the present disclosure.

FIGS. 12A and 12B illustrate a second movement of a mirror of the solar relay device for directing light to the solar cell of the mount of FIG. 1, according to examples of the present disclosure.

FIG. 16 illustrates an example process for orienting a mirror to charge a solar cell of a device, according to examples of the present disclosure.

DETAILED DESCRIPTION

Figure 1:
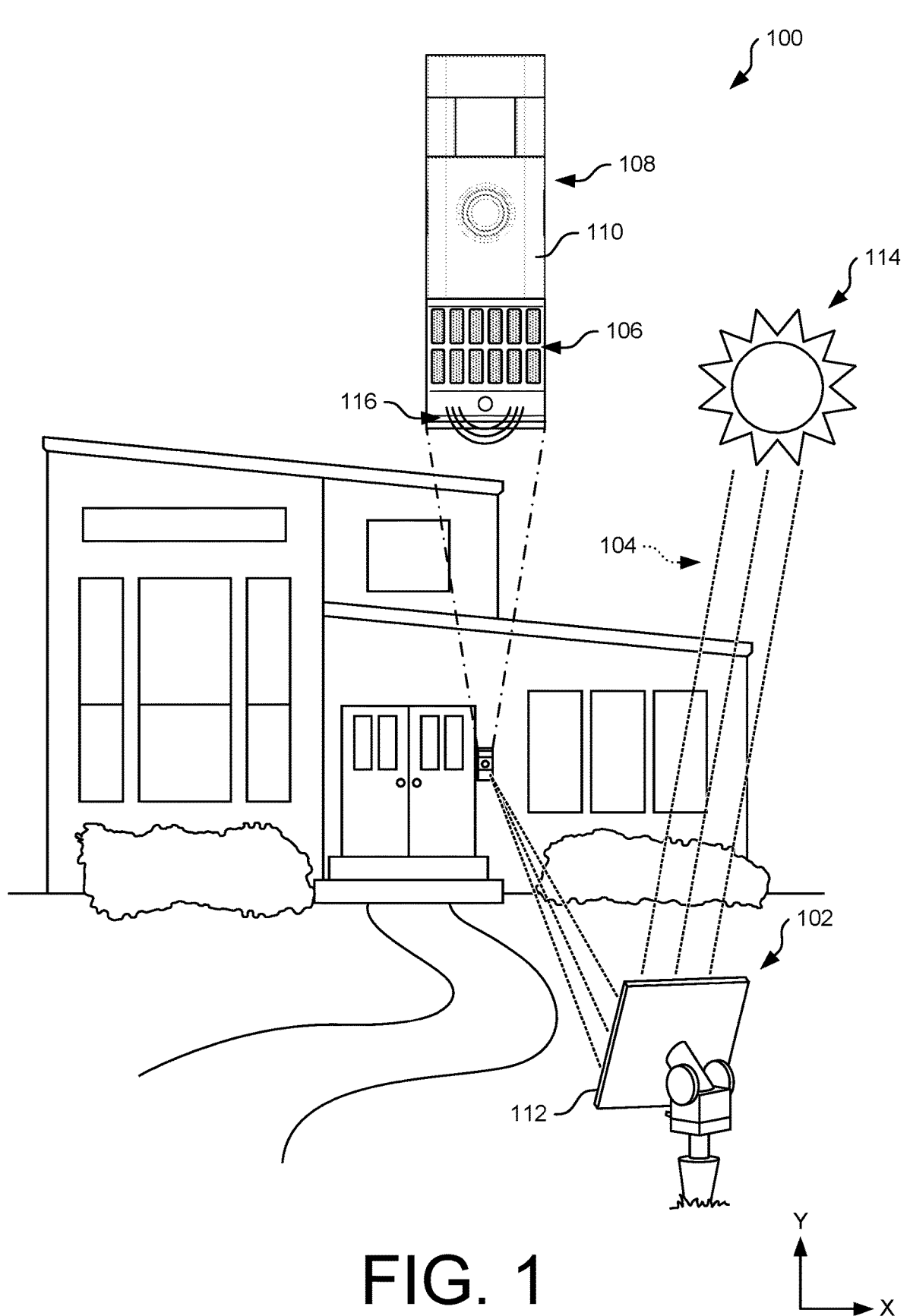
FIG. 1 illustrates an example solar relay device configured to direct light to a solar cell of a mount for charging and/or powering a device, according to examples of the present disclosure.

This application is directed, at least in part, to a solar relay device having a mirror for directing light to a solar cell of a mount that is configured to receive a device (e.g. a security camera device or a video doorbell device). For example, in some instances, the mount may be configured to receive the device, and the solar cell of the mount may be configured to power the device and/or charge a battery of the device. The solar relay device, meanwhile, may be placed within an environment for directing light to the solar cell of the mount. In some instances, the solar relay device includes motor(s) (e.g., pan and tilt motors) that adjust an orientation of the mirror in order to direct the light to the solar cell of the mount. Additionally, the mount and the solar relay device may be in communication with one another, and the mount may provide indications to the solar relay device as to an intensity of the light received by the solar cell (e.g., number of suns). In this manner, using feedback received from the mount, the solar relay device may orient the mirror towards the solar cell in order to power the device. The solar relay device may therefore be utilized to prolong a battery life of the device using solar energy.

The mount, in some instances, may include a frame, housing, bracket, etc. that is configured to couple to a surface. For example, the mount may couple to a surface (e.g., wall, siding, jamb, etc.) adjacent to a doorway, entrance, or entryway of a building (e.g., house, place of business, etc.) and/or other environment. In some instances, the mount may be coupled to the surface using fasteners. For example, the mount may include apertures through which screws are disposed for coupling the mount to the surface.

The device couples to the mount, for example, to monitor the entryway. In some instances, the device may represent an audio/visual (A/V) doorbell placed adjacent to the entryway for detecting motion. For example, the device may include various sensor(s), such as imaging sensor(s) (e.g., camera), RADAR sensor(s), passive infrared (PIR) sensor(s), etc. for detecting motion. In some instances, the imaging sensor may receive visible light for detecting motion in the environment, and the PIR sensor(s) are configured to receive IR radiation, thermal IR radiation, etc. for detecting motion within the environment 100. In response to detecting motion, the imaging sensor(s) may begin capturing image/video data, for example. The device may include other sensor(s), such as a microphone, that begins capturing audio data in response to motion. Still, the device may include other buttons, toggles, sensor(s), switches, etc. for at least partially controlling an operation of the device. In some instances, the imaging sensor(s) and/or the PIR sensor(s) may be located closer to a top of the device than a bottom of the device. Furthermore, the device may include a battery, which, in some instances, may be located closer to the bottom of the device than the top.

The mount, in some instances, may include a top, a bottom opposite the top, a front, a back opposite the top, a left side, and a right side opposite the left side. The back may be disposed against the surface, while the front may include a receptacle for receiving the device. For example, the device may be at least partially disposed within the receptacle. Generally, the device may be placed within the receptacle for coupling the device to the mount. In some instances, the device may couple to the mount via fasteners, snap-fits, key/keyways, pressure-fits, and so forth. In some instances, the mount includes alignment mechanisms (e.g., tabs, hooks, etc.) for aligning, positioning, etc. the device on the mount. Moreover, the mount may be configured to receive different types of devices, different sizes of the devices, etc.

In some instances, the receptacle of the mount that receives the device is located vertically above the solar cell of the mount, which may be located more proximate to the bottom of the mount than the top. Locating the solar cell below the device, and therefore the sensor(s) that detect motion (e.g., imaging sensor and PIR sensor(s)), may reduce light that is reflected by the mirror adversely affecting the sensor(s) detecting motion. For example, locating the solar cell and the imaging sensor and PIR sensor(s) distant from one another may avoid light that is reflected from the mirror striking the imaging sensor and PIR sensor(s), which may result in falsely detecting motion within the environment, and/or otherwise negatively impacting the imaging sensor and/or the PIR sensor(s) sensing motion (e.g., blind spots, glare, etc.). Moreover, in some instances, the placement of the solar cell on the bottom of the mount may increase an aesthetic appearance of the mount. For example, the solar cell may not be at eye level or easily discoverable when approaching the device. In some instances, the solar cell may be oriented downwards, towards a ground surface in the environment, such that the solar cell is discrete.

In some instances, the mount includes a single solar cell or multiple solar cells coupled together. The solar cell may be a solar panel, photovoltaic module, etc. In some instances, the solar cell is coupled to the mount with a hinge for adjusting a position, orientation, etc. of the solar cell. The solar cell in some instances, may have one or more degrees of movement, and/or ball-joints, pivots, etc. may be used to provide the degrees of movement. Moreover, in some instances, the hinge coupling of the solar cell to the mount permits the solar cell to be moved away for accessing the battery of the device. For example, the solar cell may be rotated away from the mount for accessing the battery of the device (e.g., to replace, recharge, install, etc.). In some instances, motor(s), actuator(s), etc. may be configured to rotate the solar cell, for example, to orient the solar cell towards the solar relay device.

In addition to the solar cell, the mount may include an energy harvesting integrated circuit (IC) (or other power management circuit), a microcontroller (e.g., processor(s), memory, etc.), and/or an emitter (e.g., an infrared (IR) emitter, transmitter, etc.). The energy harvesting IC is configured to capture and convert solar energy into electrical energy for use by the mount and/or the device. For example, the electrical energy may be used to power components of the mount, such as the emitter, as well as power and/or charge the battery of the device. As will be explained herein, the emitter may emit (e.g., broadcast) a signal (such as an IR signal) to a receiver (such as an IR receiver) of the solar relay device. The signal may include information associated with an intensity of light received by the solar cell of the mount, which correspondingly, may be used to steer the light towards the solar cell via adjustment of the mirror.

In some instances, the emitter and/or other components of the mount, such as the energy harvesting IC and the microcontroller, may be powered via energy captured from the solar cell. In this sense, the mount may not use power only from the battery of the device, but instead, may be powered additionally or alternatively via the solar energy captured from the solar cell, with excess power directed to charging the battery. In some instances, the mount may include a supercapacitor or the like for storing energy used for powering components of the mount. The supercapacitor may be charged and/or store energy via the solar cell while the solar cell receives light from the solar relay device 102.

The mount may also have wires, cables, prongs, etc. that connect to the device. For example, wires may route between the mount and the device for powering the device and/or charging the battery.

The solar relay device may be disposed about the environment for directing light to the solar cell. In some instances, the solar relay device may be staked into the ground, coupled to a surface within the environment (e.g., fence, railing, tree, etc.), or otherwise placed within the environment (e.g., set on the ground). The solar relay device may be part of an ornamental structure or a functional device such as a pathlight device. In such instances, the solar relay device may include suitable clamp(s), anchor(s), bracket(s), stake(s), etc. For example, the solar relay device may include a housing that has clamp(s), anchor(s), bracket(s), stake(s), etc. for disposing the solar relay device in the environment. In some instances, the clamp(s), anchor(s), bracket(s), stake(s), etc. may be interchangeable with one another (e.g., removably coupled to the housing) depending upon the environment.

The solar relay device may include the mirror or other reflective surface for directing light to the solar cell. In some instances, the mirror may be planar and/or square shaped. In some instances, the mirror may be a single mirror, or may be made up of multiple mirrors. However, other types and/or shapes of mirrors are envisioned. In some instances, the mirror may be pivotably or hinged to the housing (e.g., universal joint, ball joint, hinge, etc.). In some instances, the mirror may couple to the housing via one or more motors that are configured to adjust a position or an orientation of the mirror. For example, actuation of the one or more motor(s) may adjust the orientation of the mirror. In some instances, the motor(s) may adjust the orientation of the mirror in one or more directions and/or about one or more axes. For example, the motor(s) may rotate about first axis to rotate the mirror (e.g., pan) in a first direction and/or about a second axis to rotate the mirror (e.g., tilt) in a second direction. As will be explained herein, rotating the mirror serves to direct the light towards the solar cell of the mount in order to power the mount and/or the device. In this manner, by rotating the mirror, the solar relay device may "find" the solar cell of the mount.

Additionally, or alternatively, instead of rotating the mirror, the motor(s) may be configured to translate the mirror in one or more directions. For example, the solar relay device may include linear actuators that effectuate to orient the mirror by translating an extremum of the mirror relative to another. The solar relay device may also include gears for controlling movement of the mirror. For example, a gearing of the motor(s) may permit a precise movement of the mirror according to different steps, degrees, etc. That is, the gearing may include sufficient steps such that the mirror is able to precisely orient the light towards the solar cell.

As introduced above, the mount, the device, and/or the solar relay device may include receivers, transmitters, etc. for communicating with one another. For example, in some instances, the mount includes the emitter (e.g., IR light emitting diode (LED)) that emits the signal to the receiver of the solar relay device. The signal may include information associated with an intensity of light (e.g., suns) received by the solar cell of the mount. For example, as the motor(s) of the solar relay device actuate to orient the mirror, the emitter of the mount may provide feedback to the solar relay device. This feedback may be used for orienting the mirror such that the light is directed towards the solar cell of the mount. For example, the feedback may be used by solar relay device for controlling the mirror, and how to actuate the motor(s) to orient the mirror such that the light is directed towards the solar cell. In other words, as the mirror is panned and tilted by the motor(s) to different orientations, the light is directed to different positions within the environment. As the light strikes the solar cell of the mount, an intensity of the light received may increase, and as the light moves off the solar cell, an intensity of the light received may decrease. This intensity of light (e.g. an intensity value) may be determined by the mount and provided to the solar relay device via the emitter. As such, the emitter (e.g. operating as an IR transmitter) is configured to illuminate, thereby transmitting the signal, for use by the solar relay device controlling the motor(s). The receiver located on the solar relay device may remain stationary as the motor(s) actuate to adjust the orientation of the mirror. For example, the receiver may remain oriented towards the mount in order to receive the signals, while the mirror may be oriented in order to direct the light towards the solar cell.

For example, envision that the mirror is at a first orientation and light is directed to the solar cell, which records a first intensity of the light (e.g., 1.0 suns). The emitter may emit a first signal indicative of the first intensity. The solar relay device may then move the mirror to a second orientation, for example. At the second orientation, light is directed towards the solar cell, which records a second intensity of light (e.g., 1.5 suns). The emitter may emit a second signal indicative of the second intensity. In receiving these signals, the solar relay device determines which intensity is greater, and attempts to orient the mirror to achieve the greatest intensity on the solar cell. That is although the example is described as orienting the mirror at two orientations, the solar relay device may employ a searching sequence (e.g., pattern) by panning the mirror left and right and/or tilting the mirror up and down. During this searching sequence, dithering or gradient ascent may be employed to determine at what orientation of the mirror the intensity of light received by the solar cell is the greatest. The intensity of the light may be received or stored in association with the orientation of the mirror, and/or the amount of actuation/position of the motor(s). The motor(s) may be actuated to position the mirror at such orientation.

It is envisioned that as part of "finding" the solar cell, the light may not strike the solar cell. In such instances, the emitter is not powered, and the solar relay device may not receive the signal from the mount indicative of the intensity of the light. The lack of receipt of the signal by the solar relay device may cause the solar relay device to reorient the mirror. That is, in instances in which the solar relay device does not receive the signal from the mount, the solar relay device may utilize the lack of receipt of the signal to deduce that the light is not striking the solar cell, and correspondingly, may reorient the mirror in an attempt to have the light strike the solar cell (and receive the signal).

The solar relay device is able to record the position of the mirror in association with the intensity of light received by the solar cell. In some instances, during the searching sequence, the solar relay device maps the position of the mirrors with the associated intensity of light. By mapping the light intensity with the position of the mirror and/or the motor(s), the solar relay device is able to deduce the orientation of the mirror that results in the greatest intensity of light received by the solar cell. Correspondingly, the motor(s) may be actuated. Furthermore, as time progresses and the sun moves, the solar relay device may continuously move the mirror for directing the light to the solar cell. In some instances, the mirror may be moved when the intensity of light at the solar cell falls below a certain threshold. Along these same lines, instead of searching for the orientation of the mirror that results in the greatest intensity of light, the mirrors may be orientated such that the intensity of light is greater than a threshold for powering the device and/or the mount. In this sense, the solar relay device may avoid finding an optimal position of the mirror, but instead, may orient the mirror such that a sufficient amount of light is directed to the solar cell for powering the device and/or the mount. In some instances, the threshold may be based at least in part on the power draw of the mount, the device, a charge of the battery of the device, and so forth. In some instances, a dithering approach may be used, e.g. periodically initiated, to facilitate tracking of the sun as it moves across the sky.

In some instances, the signal emitted via the emitter may include information other than an intensity value indicating the intensity of light. For example, the signal may include information associated with the charge of the battery of the device, a type of device coupled to the mount, a temperature of the mount and/or the device, a root means squared (RMS) value of the intensity of light received, a maintenance status, an integrated photocurrent value, ambient temperature, and so forth. Such information may be used to control the solar relay device and/or the charging of the device. For example, if a ratio of the variance (via the RMS) to the intensity of light is above a certain threshold, the solar relay device may refrain from orienting the mirror to reflect light towards the solar cell.

In some instances, the emitter may transmit the signal when the solar cell receives a sufficient amount of light (e.g., the intensity of light received at the solar cell is sufficient to power the emitter). That is, being as the emitter is powered via solar energy, the emitter may refrain from emitting the signal until the intensity of light is sufficient to power the emitter (in addition to other components of the mount). In some instances, the rate at which the emitter transmits the signal may be based at least in part on the intensity of light received. For example, if the solar cell is receives a high intensity of light, the emitter may transmit the signal at a faster (e.g., more frequently) than if the solar cell receives a low intensity of light. For example, the emitter, based on the power level or intensity of the light, may emit the signals at a given transmission frequency. Although discussed herein as communicating with the solar relay device via the emitter, in some instances, the mount and/or the solar relay device may include network interface(s) (e.g., Wi-Fi, Bluetooth, IRDA, etc.) for communicating with one another. Still, in some instances, the mount and the solar relay device may be hardwired to one another, such as via a cable. Additionally, instead of the mount and the solar relay device being in communication, the solar relay device may be in communication with the device coupled to the mount. In such instances, the device may be configured to transmit a signal associated with characteristics of the light received via the mount, the charge of the battery, and so forth. Here, the mount and the device may be in communication.

In some instances, the solar relay device includes a film disposed over the mirror to reduce glare. In some instances, the film may be a transparent visible-light blocking film that filters visible light or a portion of the visible light such as a red (long pass) filter. In doing so, visible light (aside from a film or coating surface reflection) may not be directed (or reflected) to the solar cell, such that the solar cell may generate electrical energy via IR light. In some instances, the solar cell may be a silicon solar cell. In some instances, being as the mount and the device are disposed adjacent to the entryway, the visible-light blocking film disposed over the mirror may prevent nuisances, disturbances, irritation, etc. to persons. For example, while the light-blocking film may reduce an efficiency of the mirror by reflecting certain wavelengths of light to the solar cell, such reduction in efficiency may serve as a tradeoff to avoid the light being a nuisance, disturbance, irritation, etc. to persons entering and leaving the building. However, in some instances, to increase an efficiency of the mirror and reflect visible light to the solar cell, the light-blocking film may be removed. As such, the light-blocking film may be removable and/or replaceable. Additionally, it is envisioned that overtime the light-blocking film may become aged, damaged, dirtied, etc. For example, solar fading (e.g., sun fading), solar aging, etc. may necessitate replacement of the light-blocking film. Still, although discussed herein as a film, the solar relay device may include an ink, cover, etc. configured to block the visible light.

In addition to including the mirror, the solar relay device may include a battery for powering components of the solar relay device, such as the one or more motors and the receiver. The solar relay device may also include a solar cell for absorbing energy, charging the battery of the solar relay device, or otherwise powering the solar relay device (e.g., controllers). The solar relay device may also include various sensor(s). For example, in some instances, the solar relay device may include a sensor that generates sensor data indicative of a solar intensity of the sun. The sensor may represent a pyranometer, pyrheliometer, luminance meter, lux meter, etc. In some instances, the sensor is used to determine whether to reflect the light to the mount. For example, if the solar intensity is less than a certain threshold, the solar relay device may refrain from reflecting light towards the solar cell. An example of such a situation may be on a cloudy day, where the sunlight intensity is very low and lighting is diffuse. Here, attempting to "track" the sun may consume more power than capable of being generated. Alternatively, the amount of light capable of being reflected to the solar cell may be low and not useful for charging the battery. When the solar intensity is less than a threshold, the motor(s) may be actuated to tilt the mirror towards the sun.

Here, the solar cell of the solar relay device may best utilize the light for charging the battery of the solar relay device itself.

Additionally, or alternatively, the solar relay device may include an accelerometer or gyroscope (or both) for generating sensor data that is indicative of an acceleration or tilt experienced by the solar relay device. If the acceleration or tilt is greater than a threshold value, the solar relay device may refrain from directing the mirror towards the mount, and instead, the motor(s) may be actuated to orient the mirror towards the sun. For example, during windy conditions, reflecting the light towards the solar cell of the mount may cause a divergence of the light to the solar cell. In such instances, and during possible shaking of the solar relay device, the light may be directed towards the imaging sensor(s) and/or the PIR sensor(s), thereby negatively affecting motion sensing. Accordingly, to avoid these situations, if accelerations experienced by the solar relay device are greater than the threshold, the solar relay device may refrain from orienting the mirror to reflect light to the solar cell of the mount. In such instances, however, the solar cell of the solar relay device may utilize the light for charging the battery of the solar relay device. Otherwise, if the acceleration is less than the threshold, the solar relay device may cause the mirror to be moved to reflect light towards the solar cell of the mount. More generally, the sensor data may be associated with environmental conditions of the solar relay device and the environmental conditions may be used to determine whether and/or how to direct the mirror.

In some instances, the solar relay device may store information associated with historical orientations of the mirror for use in directing the light to the solar cell. For example, the solar relay device may store the orientations of the mirror, where the orientations are associated with a time of day, month, year, etc. In some instances, the solar relay device may utilize this information for orienting the mirror (via the motor(s)) at the start of the day, at a given time throughout the day, etc. For example, rather than "finding" the solar cell each day, for example, via performing the searching sequence or pattern, the solar relay device may preposition the mirror based on previous orientation(s) of the mirror at the same time the previous day, based on a previous orientation(s) of the mirror at the same time the previous year, and so forth. Still, in some instances, the solar relay device may utilize a position of the sun (e.g., via an analemma), weather data and/or location data for orienting the mirror. In some instances, the positions and times may be used to predict a direction to move the mirror in order to maintain a maximum, using a method such as a curve fit, proportional-integrating-derivative (PID) filter, or predictive filter such as a Kalman filter. In some instances, the recorded data may be used to infer a latitude and orientation to fit or inform to an astronomically-based model.

Although the mount and the device are described as separate components, in some instances, the device may include the solar cell, vice versa. In such instances, the mount and the device may be integrated within a single component, or a single device, apparatus, etc. Further, although the device is described as including certain sensor(s) and/or components, the device may include additional or alternative components. For example, the device may further include speaker(s) for outputting sound in the environment, lighting elements (e.g., light emitting diode(s) (LEDs)) for indicating an operational state of the device, and so forth. Additionally, the device may include other components, sensors, etc. for detecting motion within the environment.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment 100 that includes a solar relay device 102 configured to direct light 104 to a solar cell 106, according to examples of the present disclosure. In some instances, and as will be explained herein, the solar cell 106 may be disposed on a mount 108 that couples to a surface within the environment 100. For example, the mount 108 may be disposed adjacent to a doorway, entryway, etc. of a house within the environment 100. However, although described and illustrated as being placed adjacent to the entryway of the house, for example, the mount 108 may be disposed at other locations within the environment 100, such as on a fence, railing, garage, eve, etc. In such instances, the mount 108 may be coupled, or otherwise disposed within the environment 100, using fasteners, clamps, etc.

The mount 108 is configured to receive a device 110, which in some instances, monitors at least a portion of the environment 100. For example, as will be explained herein, the device 110 may represent an audio/visual (A/V) that include various sensor(s), such as imaging sensor(s) (e.g., camera), RADAR sensor(s), passive infrared (PIR) sensor(s), etc. for detecting motion within the environment 100. In response to detecting motion, the imaging sensor(s) may begin capturing image/video data, for example. The device 110 may also include a battery for powering components of the device 110, such as the imaging sensor(s), RADAR sensor(s), PIR sensor(s), and so forth.

In some instances, the device 110 is located vertically above the solar cell 106 of the mount 108 (e.g., in the Y-direction). As will be explained herein, in some instances, the sensor(s) of the device 110 that detect motion may be located closer to a top of the device 110 than a bottom of the device 110. Locating the solar cell 106 below the device 110, and therefore the sensor(s) of the device 110 that detect motion, may avoid the light 104 that is reflected by a mirror 112 of the solar relay device 102 being directed towards the sensor(s). That is, the light 104 may adversely affect the sensor(s) detecting motion, such as falsely detecting motion within the environment 100, and/or otherwise negatively impact the imaging sensor and/or the PIR sensor(s) sensing motion (e.g., false motion detection, blind spots, glare, nonideal white balance, gain setting, or exposure, etc.). Locating the solar cell 106 distant from the imaging sensor and PIR sensor(s) may therefore avoid the light 104 being reflected from the mirror 112 and striking the imaging sensor and PIR sensor(s). Moreover, in some instances, the placement of the solar cell 106 on the bottom of the mount 108 may increase an aesthetic appearance of the mount 108. For example, the solar cell 106 may not be at eye level or easily discoverable when approaching the device 110. In some instances, the solar cell 106 may be oriented downwards, towards a ground surface in the environment 100, such that the solar cell 106 is discrete.

The solar relay device 102 is shown staked into the environment 100, such as the ground. The solar relay device 102 is configured to reflect the light 104 towards the mount 108, for charging the battery of the device 110. For example, the solar relay device 102 includes the mirror 112 that directs the light 104 from the sun 114, to the solar cell 106 of the mount 108. In turn, the solar cell 106 may be used to power the mount 108 and/or the device 110 (e.g., the battery of the device 110). The solar relay device 102 may be part of an ornamental structure or a functional device such as a path-light device. The solar cell 106 may be a solar panel, photovoltaic module, etc.

The mount 108 is configured to communicate with the solar relay device 102 for orienting the mirror 112 in order to direct the light 104 to the solar cell 106. For example, the mount 108 may include an emitter (e.g., IR LED, transmitter, etc.) that emits a signal 116 to a receiver of the solar relay device 102. The signal 116 may include information associated with an intensity of the light 104 received by the solar cell 106 of the mount 108, which correspondingly, may be used to steer the light 104 towards the solar cell 106 via adjustment of the mirror 112. For example, the solar relay device 102 may include motor(s) that adjust the orientation of the mirror 112 for directing the light 104 to the solar cell 106. In some instances, the motor(s) may be capable of rotating the mirror 112 about one or more axes (e.g., X-axis, Y-axis, and/or Z-axis), for panning, tilting, and rolling the mirror 112.

More particularly, the signal 116 may be used as feedback to steer the mirror 112 in order to orient the mirror 112 such that the light 104 is directed towards the solar cell 106. In other words, as the mirror 112 is panned and/or tilted to different orientations, the light 104 is directed to different positions within the environment 100. As the light strikes the solar cell 106, an intensity of the light 104 may increase, and as the light 104 moves off the solar cell 106, an intensity of the light 104 may decrease. This intensity of light 104 is provided back to the solar relay device 102 for controlling the motor(s).

As a brief illustration, envision that the mirror 112 is at a first orientation and the light 104 is directed to the solar cell 106, which records a first intensity of the light 104 (e.g., 1.0 suns). The emitter may emit a first signal indicative of the first intensity. The solar relay device 102 may then move the mirror 112 to a second orientation, for example. At the second orientation, the light 104 is directed towards the solar cell 106, which records a second intensity of the light 104 (e.g., 1.5 suns). The emitter may emit a second signal indicative of the second intensity. In receiving these signals, the solar relay device 102 determines which intensity is greater, and attempts to orient the mirror 112 to achieve the greatest intensity of the light 104 on the solar cell 106. In some instances, the solar relay device 102 may employ a searching sequence (e.g., pattern) by panning the mirror 112 left and right and/or tilting the mirror 112 up and down. During this sequence, dithering may be employed to determine at what orientation of the mirror 112 the intensity of the light 104 received by the solar cell 106 is the greatest (e.g., via receiving the signals 116). The motor(s) may be actuated to position the mirror 112 at such orientation. However, although the example is described as orienting the mirror at two orientations, the mirror 112 may be oriented to a plurality of orientations to determine when the intensity of the light 104 is greatest.

The receiver located on the solar relay device 102 may remain stationary as the motor(s) actuate to adjust the orientation of the mirror 112. For example, the receiver may remain oriented towards the mount 108 in order to receive the signals 116, while the mirror 112 may be oriented in order to direct the light 104 towards the solar cell 106 the mount 108. In this manner, the mirror 112 may move independent of the receiver such that the receiver may continue to receive the signals 116, which in turn, may be used to adjust the orientation of the mirror. In some instances, a first portion of a housing of the solar relay device 102 that includes the mirror 112, or which couples to the mirror 112 via the motor(s), may move, while a second portion of the housing that includes the receiver may remain stationary.

In some instances, the signal 116 may include information other than the intensity of the light 104. For example, the signal 116 may include information associated with the charge of the battery of the device 110, a type of device coupled to the mount 108, a temperature of the mount 108 and/or the device 110, a root means squared (RMS) value of the intensity of the light 104 received, and so forth. Such information may be used to control the solar relay device 102 and/or charging of the device 110. For example, if a ratio of the variance (via the RMS) to the intensity of the light 104 is above a certain threshold, the solar relay device 102 may refrain from orienting the mirror 112 to reflect the light 104 towards the solar cell 106.

In some instances, the solar relay device 102 includes a film disposed over the mirror 112 to prevent glare. In some instances, the film may be a visible-light blocking film that filters visible light. As such, visible light may not be directed (or reflected) to the solar cell 106, such that the solar cell 106 may generate electrical energy via IR light. The solar cell 106 may be a silicon solar cell. In some instances, being as the mount 108 and the device 110 are disposed adjacent to the entryway, the visible-light blocking film disposed over the mirror 112 may prevent nuisances, disturbances, irritation, etc. to persons entering and leaving the house. In some instances, although the light-blocking film may reduce an efficiency of the mirror 112 by reflecting certain wavelengths of the light 104 to the solar cell 106, such reduction in efficiency may serve as a tradeoff to avoid the light 104 being a nuisance, disturbance, irritation, etc.

Although the solar relay device 102 is shown being staked into the ground, and/or at a certain location, the solar relay device 102 may be disposed at other locations or places in the environment 100. For example, the solar relay device 102 may be disposed on fences, other structures (e.g., house, shed, etc.), railings, etc. Regardless of the specific positioning, the solar relay device 102 includes the mirror 112 for directing the light 104 to the solar cell 106. The solar relay device 102 may include various clamp(s), anchor(s), bracket(s), stake(s), attachment mechanism(s), etc. for disposing the solar relay device 102 in the environment 100.

Figure 2:
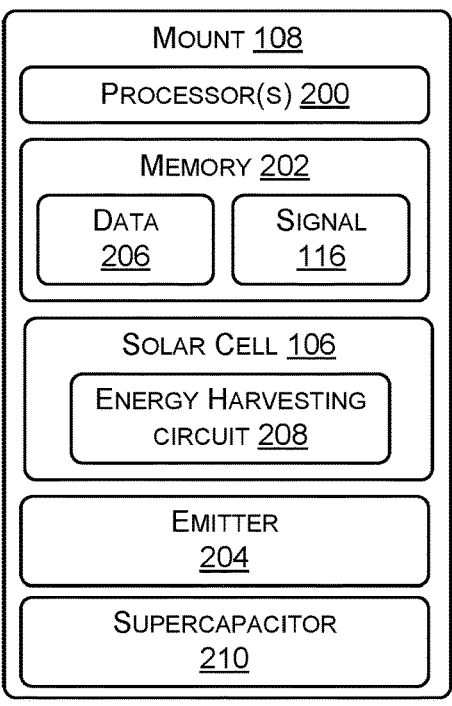
FIG. 2 illustrates an example component diagram of the mount of FIG. 1, according to examples of the present disclosure.

FIG. 2 illustrates an example component diagram of the mount 108, according to examples of the present disclosure. The mount 108 is shown including processor(s) 200 and memory 202, where the processor(s) 200 may perform various functions associated with controlling an operation of the mount 108, and the memory 202 may store instructions executable by the processor(s) 200 to perform the operations described herein.

As introduced above, the mount 108 includes the solar cell 106 configured to receive the light 104 reflected from the mirror 112 of the solar relay device 102. The solar cell 106, in some instances, includes a single solar cell or multiple solar cells coupled together. The solar cell 106 may be any suitable solar cell, photovoltaic cell/module, or electronic device that converts the energy from the light 104 into electricity caused by the photovoltaic effect. In some instances, the solar cell 106 is a silicon solar cell capable of using near IR light reflected by the mirror 112 (as well as the visible-light blocking film on the mirror 112). The electricity generated by the solar cell 106 may be used to charge the battery of the device 110 and/or components of the mount 108. In some instances, the solar cell 106 includes an energy harvesting circuit 208 (integrated circuit or other circuit) that captures and converts solar energy from the light 104 into electrical energy for use by the mount 108 and/or the device 110. Moreover, as will be explained herein, in some instances, the solar relay device 102 includes a film disposed over the mirror 112 to prevent glare. In doing so, visible light may not be directed (or reflected) to the solar cell 106. Accordingly, the solar cell may generate electrical energy via IR light received from, or reflected by, the mirror 112.

In some instances, the solar cell 106 is hingedly coupled to the mount 108 for adjusting a position, orientation, etc. of the solar cell 106. The solar cell 106 in some instances, may have one or more degrees of movement, and/or ball-joints, pivots, etc. may be used to provide the degrees of movement. Moreover, in some instances, the hinged coupling of the solar cell 106 to the mount 108 may permit the solar cell 106 to be moved away for accessing the battery of the device 110. For example, the solar cell 106 may be rotated away from the mount 108 for accessing the battery of the device 110 (e.g., to replace, recharge, install, etc.). In some instances, motor(s), actuator(s), etc. may be configured to rotate the solar cell 106, for example, to orient the solar cell 106 towards the solar relay device 102. The solar cell 106 may also include a visible-light blocking film (or ink, cover, etc.) to make the solar cell 106 less visible.

The mount 108 includes an emitter 204 that is configured to emit, or otherwise broadcast, the signal 116 to the solar relay device 102. For example, in response to receiving the light 104 on the solar cell 106, the processor(s) 200 may cause the emitter 204 to pulse and emit the signal 116. In some instances, the emitter 204 is an IR emitter, such as an IR LED, that emits an IR signal, or other suitable transmitter. The signal 116 as emitted via the emitter 204 may be indicative on an intensity of the light 104 received by the solar cell 106. For example, in response to the light 104 striking the solar cell 106, data 206 may be generated indicative of the intensity. The signal 116 may then be transmitted via the emitter 204, which includes at least a portion of the data 206 indicative of the intensity. As will be explained herein, the signal 116 may be used via the solar relay device 102 for orienting the mirror 112 to direct the light 104 to the solar cell 106.

In some instances, the emitter 204 is configured to continuously transmit the signal 116 and/or according to a certain frequency, rate, etc. For example, the emitter 204 may emit the signal 116 every second, two seconds, etc. In some instances, the rate at which the emitter 204 transmits the signal 116 may be based at least in part on the intensity of the light 104. For example, if the solar cell 106 receives a high intensity of the light 104, the emitter 204 may transmit the signal 116 at a faster rate (e.g., more frequently) than if the solar cell 106 receives a lower intensity of the light 104. In some instances, the device 110 may determine, based on the power level of the light 104, a transmission frequency at which to emit the signals 116.

In some instances, the signal 116 may include information other than the intensity of the light 104. For example, the signal 116 may include information associated with the charge of the battery of the device 110, a type of the device 110 coupled to the mount 108, a temperature of the mount 108 and/or the device 110, a root means squared (RMS) value of the intensity of the light 104 received, and so forth.

Such information may be used to control the solar relay device 102 and/or the charging the device 110. For example, if a ratio of the variance (via the RMS) to the intensity of the light 104 is above a certain threshold, the solar relay device 102 may refrain from orienting the mirror 112 to reflect the light 104 towards the solar cell 106. Such information may be stored within, or as the data 206, and be included within the signal 116 from the emitter 204

In some instances, components of the mount 108 are powered via the light 104. For example, the emitter 204, processor(s) 200, etc. may be powered via the electrical energy generated from the solar cell 106. In this sense, the mount 108 may not use power from the battery of the device 110, but instead, may be powered via solar energy captured from the solar cell 106.

Although discussed herein as communicating with the solar relay device 102 via the emitter 204, in some instances, the mount 108 and/or the solar relay device 102 may include network interface(s) (e.g., Wi-Fi, Bluetooth, etc.) for communicating with one another. Still, in some instances, the mount 108 and the solar relay device 102 may be hardwired to one another, such as via a cable. Additionally, the mount 108 may communicate with the solar relay device 102 via ultrasonic signals. The mount 108 may also have wires, cables, prongs, etc. that connect to the device 110. For example, wires may route between the mount 108 and the device 110 for powering the device 110 and/or charging the battery of the device 110. In some instances, the mount 108 may include sensor(s) (e.g., temperature sensor(s)), heat dissipating elements, fan(s), thermoelectric coolers, etc. to transfer heat away from the mount 108 (e.g., fins, coils, etc.).

The mount 108 may include a supercapacitor 210 or the like for storing energy used for powering components of the mount 108. The supercapacitor 210 may be charged and/or store energy via the solar cell 106 while the solar cell 106 receives light from the solar relay device 102.

Details of the structural characteristics and/or features of the mount 108 are discussed herein. However, generally, the mount 108 is configured to receive the device 110 and/or be mounted to surfaces within the environment 100. The mount 108 may be made of suitable materials, such as plastics, metals, composites, and/or any combination thereof.

Figure 3:
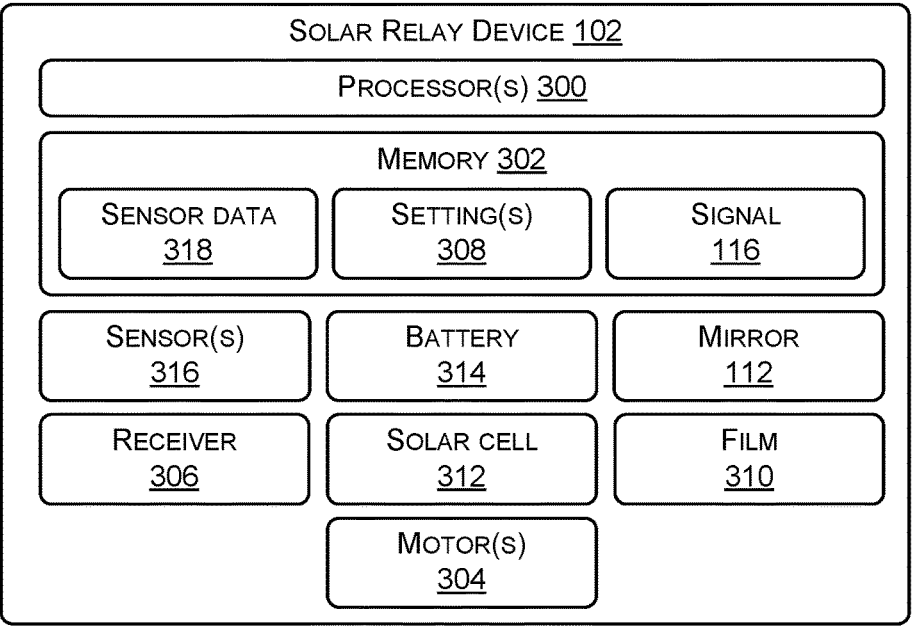
FIG. 3 illustrates an example component diagram of the solar relay device of FIG. 1, according to examples of the present disclosure.

FIG. 3 illustrates an example component diagram of the solar relay device 102, according to examples of the present disclosure. The solar relay device 102 is shown including processor(s) 300 and memory 302, where the processor(s) 300 may perform various functions associated with controlling an operation of the solar relay device 102, and the memory 302 may store instructions executable by the processor(s) 300 to perform the operations described herein.

As introduced above, the solar relay device 102 includes the mirror 112 for directing the light 104 to the solar cell 106. The mirror 112, in some instances, may be planar and/or square shaped. In some instances, the mirror 112 may be a single mirror, or may be made up of multiple mirrors. However, other types and/or shapes of mirrors are envisioned. An orientation of the mirror 112 is configured to be adjusted via one or more motor(s) 304 of the solar relay device 102. For example, actuation of the motor(s) 304 may adjust the orientation of the mirror 112, and therefore, adjust a direction of the light 104. In some instances, the motor(s) 304 may represent servo motor(s), stepper motor(s), brushless motor(s), and so forth. Additionally, instead of having motor(s) the solar relay device 102 may include other actuator(s) (e.g., linear actuators, screw drives, etc.).

In some instances, the motor(s) 304 may adjust the orientation of the mirror 112 in one or more directions. For example, the motor(s) 304 may rotate about first axis to rotate the mirror 112 (e.g., pan) in a first direction, about a second axis to rotate the mirror 112 (e.g., tilt) in a second direction, and/or about a third axis to rotate the mirror 112 (e.g., roll) in a third direction. Rotating the mirror 112, or adjusting the orientation of the mirror 112, serves to direct the light 104 towards the solar cell 106 of the mount 108 to power the mount 108 and/or the device 110. In this manner, by rotating the mirror 112, the solar relay device 102 may "find" the solar cell 106 of the mount 108.

The solar relay device 102 includes a receiver 306, such as an IR receiver, configured to receive the signal 116 emitted by the emitter 204. The processor(s) 300 may be configured to store the signal 116, or data associated therewith, within the memory 302 once received from the emitter 204. The solar relay device 102 may utilize the signal 116 for controlling the motor(s) 304 to adjust the orientation of the mirror 112. For example, the solar relay device 102 may determine the intensity of the light 104 received via the solar cell 106 based at least in part on the signal 116. In some instances, the solar relay device 102 may compare the intensity of the light 104 received by the solar cell 106, via the signals 116, for use in panning, tilting, or rolling the mirror 112. For example, if the intensity of the light 104 is greater at a first orientation of the mirror 112 than a second orientation of the mirror 112, the mirror 112 may be oriented accordingly. In some instances, the memory 202 may store setting(s) 308, which indicate the positions of the motor(s) 304 in association with the orientation of the mirror 112. Here, the solar relay device 102 may map the intensity of the light 104 to the associated positions of the motor(s) 304 for orienting the mirror 112 accordingly.

In some instances, the solar relay device 102 may employ a searching sequence (e.g., pattern) by panning the mirror 112 left and right, tilting the mirror 112 up and down, and/or rolling the mirror 112 side to side. During this searching sequence, dithering is employed to determine at what orientation of the mirror 112 the intensity of the light 104 received by the solar cell 106 is greater. Therein, the motor(s) 304 may be actuated to orient the mirror 112. Moreover, during this search sequence, the mount 108 may report the intensity of the light 104, via the signal(s) 116, for use by the solar relay device 102 in controlling the motor(s) 304. The solar relay device 102 may record the position of the mirror 112 in association with the intensity of the light 104 received by the solar cell. In some instances, during the searching sequence, the solar relay device 102 maps the position of the mirror 112 and/or the motor(s) 304 with the associated intensity of the light 104. By mapping the intensity of the light 104 with the orientation of the mirror 112, the solar relay device 102 is able to deduce the orientation of the mirror 112 that results in the greatest intensity of the light 104 received by the solar cell 106. Correspondingly, the motor(s) 304 may be actuated such that the light 104 strikes the solar cell.

Furthermore, as time progresses and the sun 114 moves, the solar relay device 102 may continuously move the mirror 112 for directing the light 104 to the solar cell 106. In some instances, the mirror 112 may be moved when the intensity of the light 104 falls below a certain threshold (e.g., as stored in the setting(s) 308). Along these same lines, instead of searching for the orientation of the mirror 112 that results in the greatest intensity of the light 104, the mirror 112 may be orientated such that the intensity of the light 104 is greater than a threshold for powering the device 110 and/or the mount 108. In some instances, the threshold may be based at least in part on the power draw of the mount 108, the device 110, a charge of the battery of the device, and so forth.

The setting(s) 308 may also indicate, or be associated with, historical orientations of the mirror 112. For example, setting(s) 308 may indicate previous orientations of the mirror 112 in association with a time of day, month, year, etc. In some instances, the solar relay device 102 may utilize the setting(s) 308 for orienting the mirror 112 at the start of the day, at a given time throughout the day, etc. For example, rather than "finding" the solar cell 106 each day, for example, via performing the searching sequence or pattern, the solar relay device 102 may preposition the mirror 112 based on previous orientation(s) of the mirror 112 at the same time the previous day, based on a previous orientation of the mirror 112 at the same time the previous year, and so forth. Still, in some instances, the solar relay device 102 may utilize a position of the sun 114 (e.g., via an analemma) and/or weather data for orienting the mirror 112.

A film 310 may be at least partially disposed over the mirror 112. In some instances, the film 310 may be a visible-light blocking film that filters visible light to prevent glare. The film 310 may be transparent. In doing so, visible light may not be directed (or reflected) to the solar cell 106, such that the solar cell 106 may generate electrical energy via IR light. In some instances, being as the mount 108 and the device 110 are disposed adjacent to the entryway of the house, the film 310 may prevent nuisances, disturbances, irritation, etc. to persons entering and leaving. For example, although the film 310 may reduce an efficiency of the mirror 112 by reflecting certain wavelengths of the light 104 to the solar cell 106, such reduction in efficiency may serve as a tradeoff to avoid the light 104 being a nuisance, disturbance, irritation, etc. In some instances, the film 310 may be removed to increase an efficiency of the mirror 112 and reflect visible light to the solar cell 106.

The film 310 may also be replaceable. Additionally, it is envisioned that overtime the film 310 may become aged, damaged, dirtied, etc. For example, solar fading, solar aging, etc. may necessitate replacement of the film 310. Still, although discussed herein as a film, the solar relay device 102 may include an ink, cover, etc. configured to block the visible light.

A solar cell 312 may power components of the solar relay device 102. In some instances, the solar cell 312 may be similar to the solar cell 106. For example, the solar cell 312 may convert solar energy into electrical energy for use by the solar relay device 102. In some instances, the solar cell 312 may be a silicon solar cell. The solar cell 312 may also be configured to charge a battery 314 of the solar relay device 102, where the battery 314 may power components of the solar relay device 102. In some instances, the solar relay device 102 may be configured to reflect the light 104 towards the solar cell 106, and/or may be configured to utilize the light 104 for itself.

The solar relay device 102 may include sensor(s) 316 that generate sensor data 318. Example sensor(s) 316, by way of example, may include light sensor(s), accelerometer(s), temperature sensor(s), etc. In some instances, the light sensor(s) may generate the sensor data 318 that indicates an intensity of the light 104 within the environment 100. The accelerometer(s) may generate the sensor data 318 that indicates accelerations experienced by the solar relay device 102. In some instances, the sensor data 318 may be used to at least partially control operations of the solar relay device 102. For example, if the solar intensity is less than a certain threshold, the solar relay device 102 may refrain from reflecting the light 104 towards the solar cell 106. In this instance, an amount of the light 104 capable of being reflected to the solar cell 106 may be low and unable to charge the battery of the device 110. In some instances, when the solar intensity is less than the threshold, the motor(s) 304 may be actuated to orient the mirror 112 towards the sun. Here, the solar cell 312 may utilize the light 104 itself for charging the battery 314 of the solar relay device 102. To locate or find the sun 114, or orient the solar cell 312, the processor(s) 300 may utilize feedback received from the solar cell 312 indicative of the intensity of the light 104 for controlling the motor(s) 304.

As another example, if the acceleration is greater than a threshold acceleration, the solar relay device 102 may refrain from directing the mirror 112 towards the mount 108, and instead, the motor(s) 304 may be actuated to orient the mirror 112 towards the sun 114. For example, during windy conditions, reflecting the light 104 towards the solar cell 106 may cause a divergence of the light 104. In such instances, and during possible shaking of the solar relay device 102, the light 104 may be directed towards the imaging sensor(s) and/or the PIR sensor(s) of the device 110, thereby negatively affecting motion sensing. Accordingly, to avoid these situations, if the accelerations experienced by the solar relay device 102 are greater than the threshold, the solar relay device 102 may refrain from orienting the mirror 112 to reflect the light 104 to the solar cell 106. In such instances, however, the solar cell 312 of the solar relay device 102 may utilize the light 104 for charging the battery 314 of the solar relay device 102. Otherwise, if the acceleration is less than the threshold, the solar relay device 102 may cause the mirror 112 to be oriented to reflect the light 104 towards the solar cell 106. More generally, the sensor data 318 may be associated with environmental conditions of the solar relay device 102, and such environmental conditions may be used to at least partially control an operation of the solar relay device 102.

Details of the structural characteristics and/or features of the solar relay device 102 are discussed herein. However, generally, the solar relay device 102 is configured to be disposed within the environment 100. For example, the solar relay device 102 may include an attachment mechanism, such as stakes, clamps, brackets, etc. for disposing and/or securing the solar relay device 102 in the environment 100. The solar relay device 102 may be made of suitable materials, such as plastics, metals, composites, and/or any combination thereof.

As used herein, a processor, such as the processor(s) 200 and/or the processor(s) 300, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 202 and/or the memory 302, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s). In some instances, the memory 202 and/or the memory 302 may represent one or more non-transitory computer-readable media storing instructions that, when executed by the processor(s) 200 and the processor(s) 300, respectively, cause the processor(s) 200 and the processor(s) 300 to perform recited operations.

Figure 4:
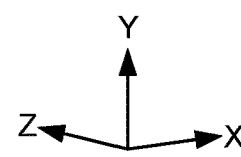
FIG. 4 illustrates a perspective view of the device disposed on the mount of FIG. 1, according to examples of the present disclosure.

FIG. 4 illustrates a perspective view of the mount 108 and the device 110, according to examples of the present disclosure. In some instances, the device 110 may represent any suitable device having motion sensing capabilities, imaging capturing capabilities, audio capturing capabilities, and so forth. An example device may include, for example, the device disclosed U.S. patent application Ser. No. 18/343, 365, filed Jun. 28, 2023, the entirety of which is herein incorporated by reference for all its purposes.

The device 110 is configured to be disposed at least partially on the mount 108, at a location above the solar cell 106 (e.g., in the Y-direction), such that sensor(s) of the device 110 are spaced apart from the light 104 being directed to the solar cell 106. For example, the device 110 may include PIR sensor(s) disposed beneath a first cover 400 of the device 110, and an imaging sensor (e.g., camera) disposed beneath a second cover 402 of the device 110. In some instances, the PIR sensor(s) may be located closer to a top of the device 110 as compared to the imaging sensor. The imaging sensor may be configured to receive visible light (or radiation) for detecting motion in the environment 100, while the PIR sensor(s) are configured to receive IR light (or radiation e.g. thermal IR radiation), etc. for detecting motion within the environment 100. However, although a particular arrangement of the sensor(s) are shown, and/or that the sensor(s) are disposed beneath certain cover(s), other embodiments are envisioned.

As will be explained herein, the device 110 may couple (e.g., mount) to the mount 108 for being disposed in the environment 100. In some instances, the mount 108 may include a base 404 that couples to a surface within the environment 100. The solar cell 106 may hingedly couple to the base 404 via a hinge 408. In some instances, the solar cell 106 is disposed on a body 406 (e.g., frame), where the body 406 hingedly couples to the base 404 via the hinge 408. The body 406 may also include the emitter 204 for outputting the signals 116 to the solar relay device 102.

Although the mount 108 and the device 110 are described as separate components, in some instances, the device 110 may include the solar cell 106, and/or the device 110 and the mount 108 may be integrated with one another. In such instances, the mount 108 and the device 110 may be combined within a single component, or device, apparatus, etc.

FIG. 5 illustrates a side view of the mount 108 and the device 110, according to examples of the present disclosure. As shown, the device 110 may reside vertically above the solar cell 106, which is located along a front of the mount 108. The solar cell 106 hingedly couples to the mount 108 via the hinge 408. The solar cell 106 may hinge (e.g., about the X-axis) for accessing a battery of the device 110, and/or for adjusting an orientation of the solar cell 106. For example, the battery of the device 110 may be located at a bottom of the device 110, opposite the top.

In FIG. 5, the solar cell 106 (or the body 406) may be at a first position. Here, the solar cell 106 may be restricted from being rotated further in a direction towards the base 404 (e.g., counterclockwise about the X-axis). However, the solar cell 106 may be rotated in a direction away from the base 404 (e.g., clockwise about the X-axis). At the first position, and as shown, the solar cell 106 may be oriented in direction downwards (e.g., towards the ground surface). In some instances, the orientation of the solar cell 106 may direct the solar cell 106 towards the solar relay device 102, and/or may increase an aesthetic appearance of the mount 108.

The mount 108 may have various orifices to assist in dissipating heat. For example, in some instances, first orifices 500 may be disposed on one or more sides of the base 404, while second orifices 502 may be disposed on one or more sides of the body 406. The mount 108, in some instances, may also include fans, thermoelectric coolers, etc. for dissipating heat.

Figure 6:
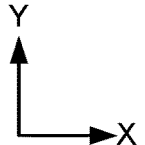
FIG. 6 illustrates a front view of the device disposed on the mount of FIG. 1, according to examples of the present disclosure.

FIG. 6 illustrates a front view of the mount 108 and the device 110, according to examples of the present disclosure. The device 110 resides vertically above the solar cell 106 for locating the PIR sensor(s) and the imaging sensor distant from the light 104 being directed to the solar cell 106. Locating the solar cell 106 below the device 110, and therefore the sensor(s) of the device 110 that detect motion, may reduce an occurrence and/or chance the light 104 is directed towards the sensor(s). That is, the light 104 may adversely affect the sensor(s) detecting motion, such as falsely detecting motion within the environment 100, and/or otherwise negatively impacting the imaging sensor and/or the PIR sensor(s) sensing motion (e.g., blind spots, glare, etc.).

Moreover, in some instances, the placement of the solar cell 106 below the device 110 may increase an aesthetic appearance of the mount 108 and/or the mount 108. For example, the solar cell 106 may not be at eye level or easily discoverable when approaching the device 110. In some instances, the solar cell 106 may be oriented downwards, towards a ground surface in the environment 100, such that the solar cell 106 is discrete. In some instances, a film may be disposed over the solar cell 106 for visually concealing the solar cell 106. Although the solar cell 106 is shown including a certain number of, or being made up of a certain number of the solar cells, the solar cell 106 may include a different number of the solar cells as shown and/or oriented/ positioned differently than shown.

Figure 7:
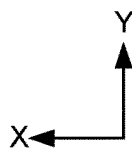
FIG. 7 illustrates a rear view of the device disposed on the mount of FIG. 1, according to examples of the present disclosure.

FIG. 7 illustrates a rear view of the mount 108, according to examples of the present disclosure. In some instances, the mount 108 may include an aperture 700 for connecting to contacts 702 of the device 110 (e.g., a first contact 702(1) and a second contact 702(2)) of the device 110. For example, the mount 108 may include a first wire 704 and a second wire 706 that couple to the contacts 702. The first wire 704 and the second wire 706 may route through the mount 108, the hinge 408, etc. for transferring power generated by solar cell 106 to the device 110. By coupling to the contacts 702, power may be directed to the device 110 for charging the battery. However, the first wire 704 and/or the second wire 706 may be routed differently than shown. For example, the first wire 704 and the second wire 706 may be disposed internally to the base 404.

The mount 108, such as the base 404, may also include holes 708 through which fasteners are disposed for coupling the mount 108 to surface(s) within the environment 100.

FIG. 8 illustrates an operation of the hinge 408 to reposition the solar cell 106, according to examples of the present disclosure. For example, from the first position of the solar cell 106 in FIG. 5 (e.g., the first position), the solar cell 106 (or the body 406) may be rotated in a direction away from the mount 108 (e.g., clockwise about the X-axis) to a second position. At the second position, the battery may be removed from the device 110. Additionally, at the second position, the solar cell 106 may have a different orientation with regard to the mirror 112 for receiving the light 104. As such, the solar cell 106 may be reoriented via the hinge 408 to adjust a field of view for receiving the light 104 from the solar relay device 102. However, although the solar cell 106 is shown at certain positions, or being rotated by a certain amount, the solar cell 106 may be rotated to other positions. Furthermore, rather than including the hinge 408, the mount 108 may include a pivot, ball and socket joint, etc. for providing movement to the solar cell 106.

In some instances, the solar cell 106 may communicatively connect to computing components located within the base 404. For example, the body 406 may include first computing components, such as the solar cell 106 and the emitter 204, while the base 404 may include second computing components, such as the energy harvesting circuit 208, PCBs, etc. In some instances, the first computing components and the second computing components may be communicatively connected via cable(s) 800. In some instances, the cable(s) 800 may be disposed between base 404 and the body 406, may route through the hinge 408, etc.

Figure 9A:
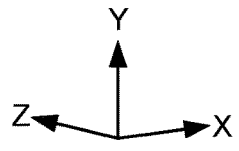
Figure 9B:
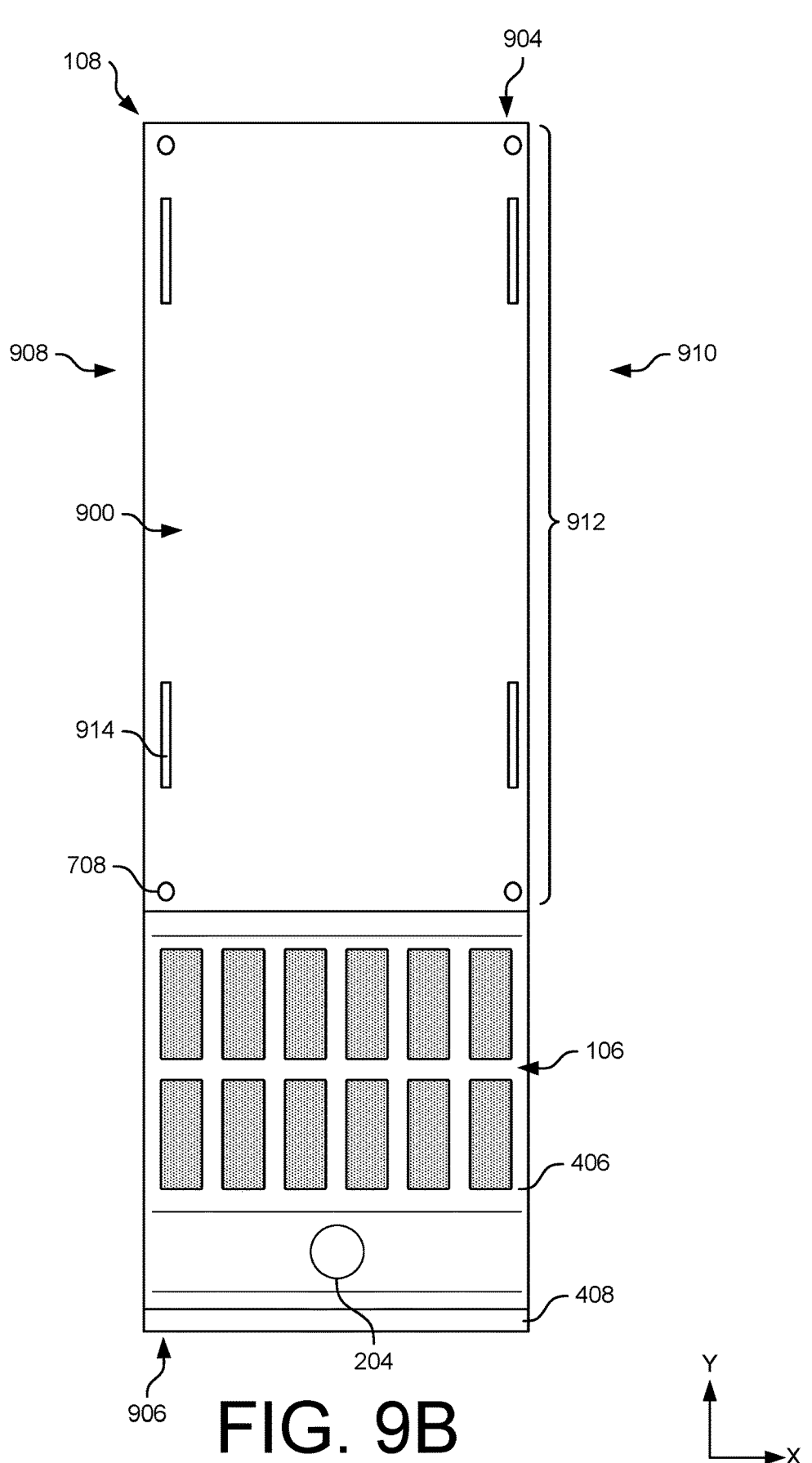

FIGS. 9A-9C illustrate various views of the mount 108, according to examples of the present disclosure. FIG. 9A illustrates a front perspective view of the mount 108, FIG. 9B illustrates a front planar view of the mount 108, and FIG. 9C illustrates a side view of the mount 108.

In some instances, the mount 108 includes a front 900, a back 902 opposite the front 900 (e.g., in the Z-direction), a top 904, a bottom 906 opposite the top 904 (e.g., in Y-direction), a first side 908, and a second side 910 opposite the first side 908 (e.g., in the X-direction). As shown, the solar cell 106 (or the body 406) may be located along the front 900, closer to the bottom 906 than the top 904. Although a certain size of the solar cell 106 (or the body 406) is shown, other sizes are envisioned. For example, the solar cell 106 may extend less than a width of the mount 108, between the first side 908 and the second side 910 (e.g., in the X-direction). Additionally, the emitter 204 may be located closer to the bottom 906 than the solar cell 106. However, the emitter 204 may be located differently than shown, and/or in some instances, the emitter 204 may not be located on the body 406. The hinge 408 may be located along the bottom 906 for hingedly coupling the body 406 to the base 404. In some instances, the hinge 408 may be located differently than shown. For example, the hinge 408 may be spaced apart from the bottom 906.

The mount 108 defines a receptacle 912 that receives the device 110. In some instances, the receptacle 912 may correspond to a mounting face of the mount 108 for receiving the device 110. The receptacle 912 is disposed vertically above the solar cell 106 (or the body 406). In some instances, the receptacle 912 may be interposed between a top of the solar cell 106 (or the body 406), and the top 904 of the mount 108. The receptacle 912 may also extend between the first side 908 and the second side 910, or may extend less than an entirety of a distance between the first side 908 and the second side 910. When coupled to the mount 108, such as the base 404, the device 110 may be at least partially disposed within the receptacle 912.

In some instances, the device 110 may couple to the mount 108 via fasteners, snap-fits, key/keyways, pressure-fits, adhesives, and so forth. For example, fasteners may be disposed through the device 110 and through the holes 708. In other instances, the fasteners may be disposed into the base 404, and thereafter, the mount 108 (with the device 110), may be secured to the surface. In some instances, the mount 108 includes alignment mechanisms 914 (e.g., tabs, hooks, etc.) for aligning, positioning, etc. the device 110 on the mount 108. The alignment mechanisms 914 may be disposed at a location within the receptacle 912, and may be defined by surfaces of the base 404. The mount 108 may also include the first orifices 500 (e.g., in the base 404) and the second orifices 502 (e.g., in the body 406) for dissipating heat.

Figure 10A:
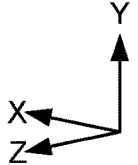
FIGS. 10A-10C illustrate the solar relay device of FIG. 1, according to examples of the present disclosure.
Figure 10B:
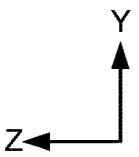
Figure 10C:
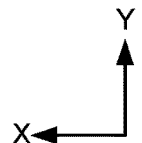

FIGS. 10A-10C illustrate various views of the solar relay device 102, according to examples of the present disclosure. FIG. 10A illustrates a front perspective view of the solar relay device 102, FIG. 10B illustrates a side view of the solar relay device 102, and FIG. 10C illustrates a front planar view of the solar relay device 102. The solar relay device 102 may include the mirror 112 for directing the light 104 towards the solar cell 106 of the device 110, and motor(s) 304 that adjust an orientation of the mirror 112. In some instances, the mirror 112 may be planar (e.g., flat) and/or square shaped. In some instances, the mirror 112 may be a single mirror, or may be made up of multiple mirrors. However, other types and/or shapes of mirrors are envisioned. In some instances, the motor(s) 304 are disposed within a housing 1000 of the solar relay device 102. Additional components of the solar relay device 102 may be disposed within the housing 1000 (e.g., energy harvesting circuit, PCBs, the battery 314, etc.). Gears may also be disposed within the housing 1000 for permitting adjustment of the orientation of the mirror 112 via the motor(s) 304.

In some instances, the mirror 112 is disposed within, on, or is part of a frame 1002 that couples to the housing 1000. The mirror 112 may be located along a front 1004 of the frame 1002. The housing 1000 may couple to a back 1006 of the frame 1002, opposite the front 1004, via an arm 1008. Actuation of the motor(s) 304 may correspondingly adjust an orientation of the mirror 112. The frame 1002 also includes the solar cell 312, which generates electrical power for use by the solar relay device 102 (e.g., for powering the motor(s) 304). In some instances, the solar cell 312 is located on a portion of the frame 1002 and/or along the front 1004, at a location below the mirror 112.

The housing 1000 may also include the receiver 306 configured to receive the signals 116 from the emitter 204. In some instances, the receiver 306 is located vertically below the frame 1002, and oriented towards the front 1004 of the mount 108. In some instances, the housing 1000 includes a cover 1012 (e.g., shield, projection, hood, etc.) disposed above the receiver 306 for shielding the receiver 306. During actuation of the motor(s) 304, the receiver 306 and the cover 1012 may remain stationary. For example, a portion of the housing 1000 on which or to which the receiver 306 and the cover 1012 are disposed may remain stationary. In doing so, the receiver 306 remains oriented towards the mount 108 for receiving the signals 116. Although the solar cell 312 and the receiver 306 are shown at certain locations, the receiver 306 may be located differently than shown.

The solar relay device includes the film 310 disposed over at least a portion of the mirror 112 and/or the solar cell 312. In some instances, the film 310 may be a visible-light blocking film that filters visible light. In doing so, visible light may not be directed (or reflected) to the solar cell 106, such that the solar cell 106 may generate electrical energy via IR light. In some instances, the film 310 may be removable and/or replaceable. For example, it is envisioned that overtime the film 310 may become aged, damaged, dirtied, etc. Solar fading (e.g., sun fading), solar aging, etc. may necessitate replacement of the film 310. Still, although discussed herein as a film, the solar relay device 102 may include an ink, cover, etc. configured to block the visible light.

The solar relay device 102 may also include a stake 1010. In some instances, the stake 1010 is placed into the ground for disposing the solar relay device 102 within the environment 100. The stake 1010 may extend from the housing 1000. However, although shown as including the stake 1010, the solar relay device 102 may include suitable clamp(s), bracket(s), anchor(s), etc. For example, the solar relay device 102 may include clamp(s) for coupling the solar relay device 102 to rails, fences, trees, etc.

Figure 11A:
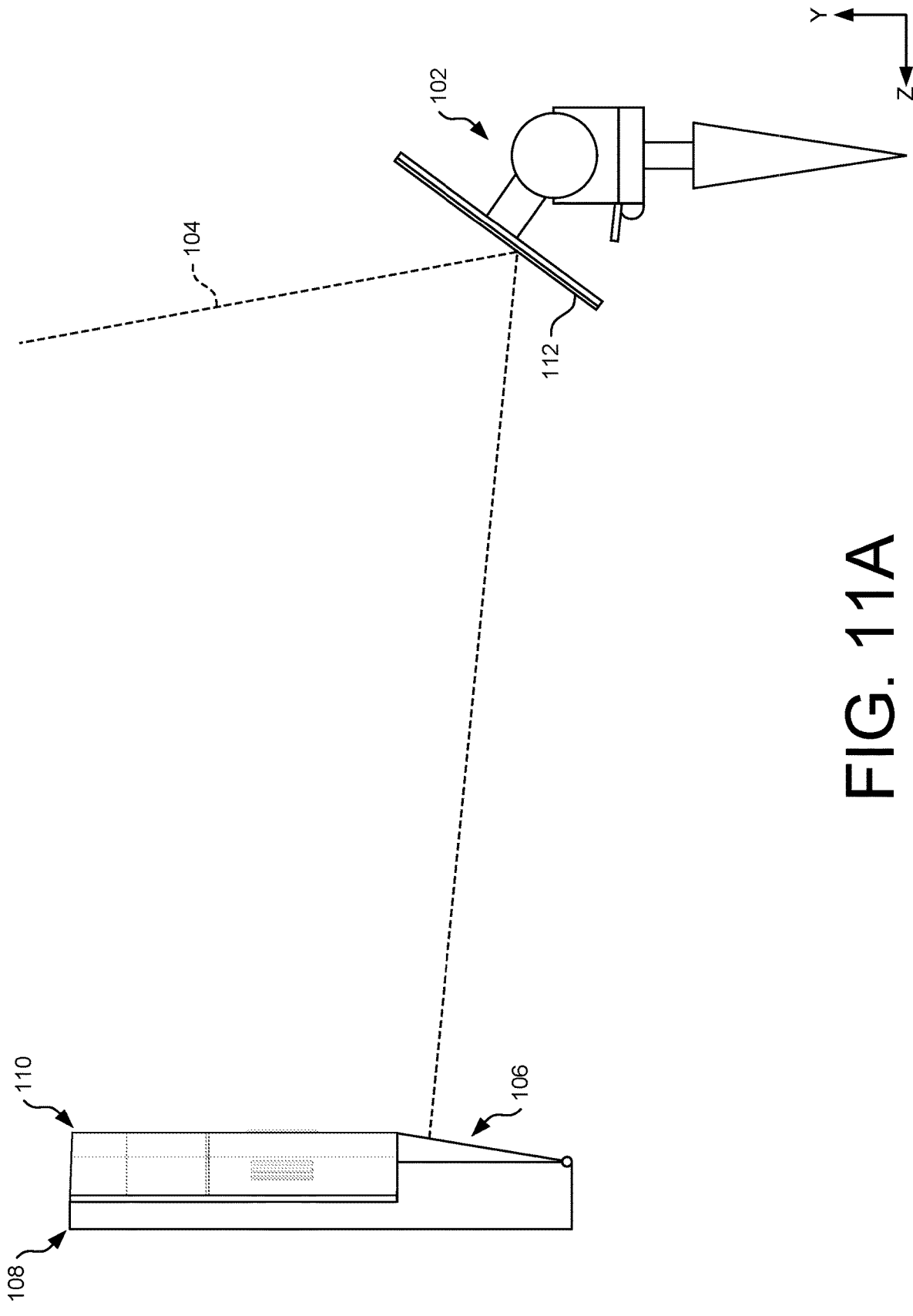
FIGS. 11A and 11B illustrate a first movement of a mirror of the solar relay device for directing light to the solar cell of the mount of FIG. 1, according to examples of the present disclosure.
Figure 11B:
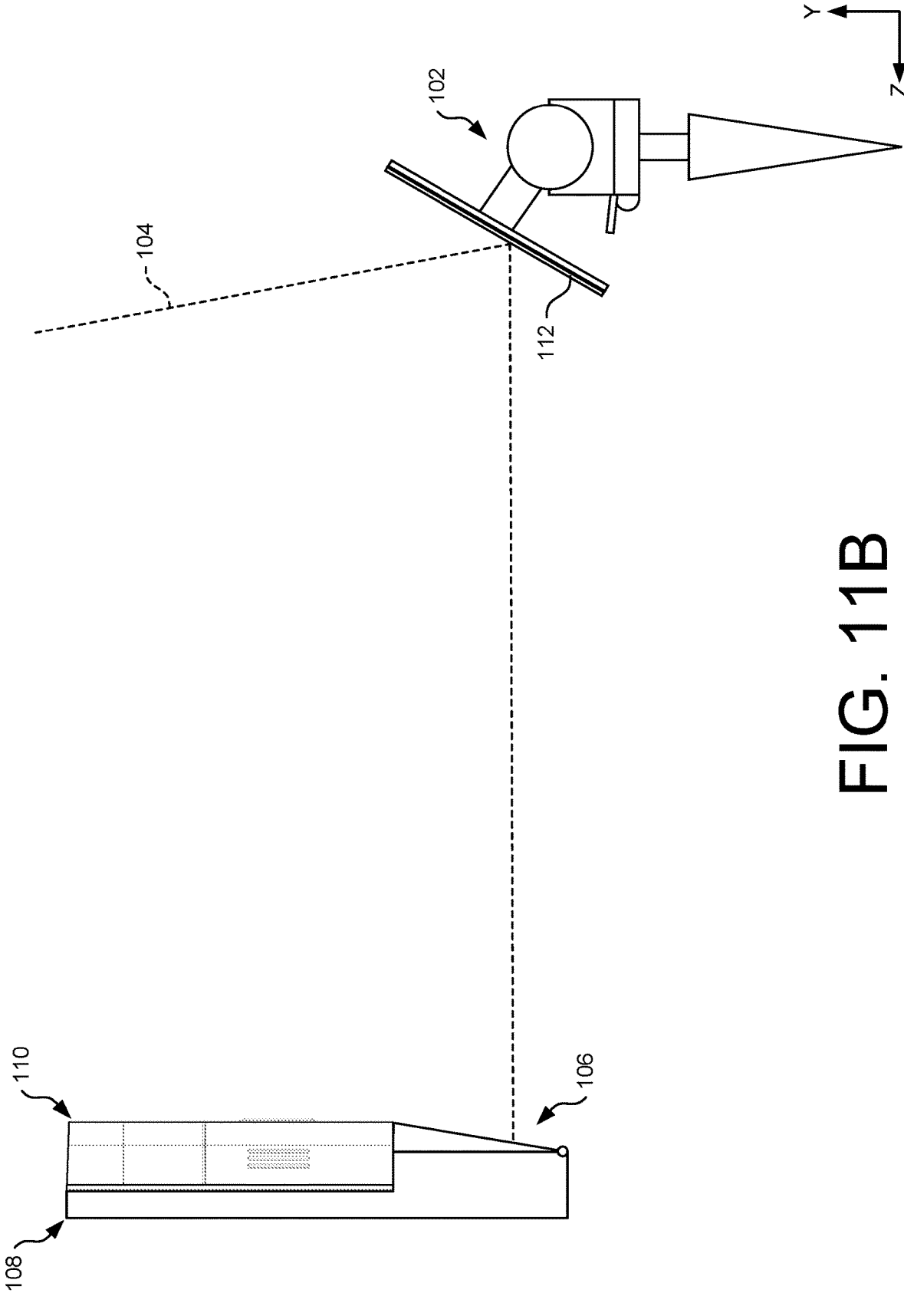

FIGS. 11A and 11B illustrate a positioning of the solar relay device 102 for directing the light 104 to the solar cell 106. More particularly, in FIG. 11A, the mirror 112 has a first orientation, while in FIG. 11B, the mirror 112 has a second orientation. The motor(s) 304 are configured to adjust the orientation of the mirror 112, for example, between the first orientation in FIG. 11A and the second orientation in FIG. 11B. The mirror 112 may be rotated (e.g., tilted) about a first axis (e.g., the X-axis) between the first orientation and the second orientation via the motor(s) 304.

At the first orientation, the light 104 is shown striking the solar cell 106 at a first position. In response to the light 104 striking the solar cell 106, the emitter 204 may generate and transmit the signal 116 for receipt by the receiver 306. As discussed herein, the signal 116 may indicate the intensity of the light 104. Similarly, at the second orientation, the light 104 is shown striking the solar cell 106 at a second position. In response, the emitter 204 may generate and transmit the signal 116 for receipt by the receiver 306. The solar relay device 102 uses the signals 116 for determining how to actuate the motor(s) 304 to orient the mirror 112. For example, the solar relay device 102 may determine whether the intensity of the light 104 is greater at the first orientation or the second orientation. Moreover, the solar relay device 102 may actuate the motor(s) 304 to orient the mirror 112 at other orientations. For example, the mirror 112 may be oriented to a third orientation between the first orientation and the second orientation. Regardless, as the motor(s) 304 are actuated, the solar relay device 102 may receive feedback as to the intensity of the light 104 for use in orienting the mirror 112.

Although FIGS. 11A and 11B illustrate the light 104 striking the solar cell 106, it is envisioned that as part of "finding" the solar cell 106, the light 104 may not strike the solar cell 106. In such instances, the solar relay device 102 may not receive the signal 116 from the mount 108 (e.g., the mount 108 may not generate the signal 116). The lack of receipt of the signal 116 by the solar relay device 102 may cause the solar relay device 102 to reorient the mirror 112. That is, in instances in which the solar relay device 102 does not receive the signal 116 from the mount 108, the solar relay device 102 may utilize the lack of receipt of the signal 116 to deduce that the light 104 is not striking the solar cell 106, and correspondingly, may reorient the mirror 112 in an attempt to have the light 104 strike the solar cell 106 (and receive the signal 116).

FIGS. 12A and 12B illustrate a positioning of the solar relay device 102 for directing the light 104 to the solar cell 106. More particularly, in FIG. 12A, the mirror 112 has a first orientation, while in FIG. 12B, the mirror 112 has a second orientation. The motor(s) 304 are configured to adjust the orientation of the mirror 112, for example, between the first orientation in FIG. 12A and the second orientation in FIG. 12B. The mirror 112 may be rotated (e.g., panned) about a second axis (e.g., the Y-axis) between the first orientation and the second orientation via the motor(s) 304.

At the first orientation, the light 104 is shown striking the solar cell 106 at a first position. In response to the light 104 striking the solar cell 106, the emitter 204 may generate and transmit the signal 116 for receipt by the receiver 306. At the second orientation, the light 104 is shown striking the solar cell 106 at a second position. In response, the emitter 204 may generate and transmit the signal 116 for receipt by the receiver 306. The solar relay device 102 uses the signals 116 for determining how to actuate the motor(s) 304 and orient the mirror 112. For example, the solar relay device 102 may determine whether the intensity of the light 104 is greater at the first orientation or the second orientation. Moreover, the solar relay device 102 may actuate the motor(s) 304 to orient the mirror 112 at other orientations. For example, the mirror 112 may be oriented to a third orientation between the first orientation and the second orientation. Regardless, as the motor(s) 304 are actuated, the solar relay device 102 may continuously receive feedback as to the intensity of the light 104 for use in orienting the mirror 112.

Although FIGS. 12A and 12B illustrate the light 104 striking the solar cell 106, it is envisioned that as part of "finding" the solar cell 106, the light 104 may not strike the solar cell 106. In such instances, the solar relay device 102 may not receive the signal 116 from the mount 108. The lack of receipt of the signal 116 by the solar relay device 102 may cause the solar relay device 102 to reorient the mirror 112. That is, in instances in which the solar relay device 102 does not receive the signal 116 from the mount 108, the solar relay device 102 may utilize the lack of receipt of the signal 116 to deduce that the light 104 is not striking the solar cell 106, and correspondingly, may reorient the mirror 112 in an attempt to have the light 104 strike the solar cell 106 (and receive the signal 116).

In some instances, the solar relay device 102 may orient the mirror 112 about the different axes in sequence, or in parallel. For example, in FIGS. 11A and 11B, the mirror 112 is rotated about the first axis, while in FIGS. 12A and 12B, the mirror 112 is rotated about the second axis. In some instances, the mirror 112 may be rotated about the first axis and the second axis in parallel. As such, the mirror 112 may be oriented about more than one axis at the same time for directing the light 104 towards the solar cell 106.

Figure 13A:
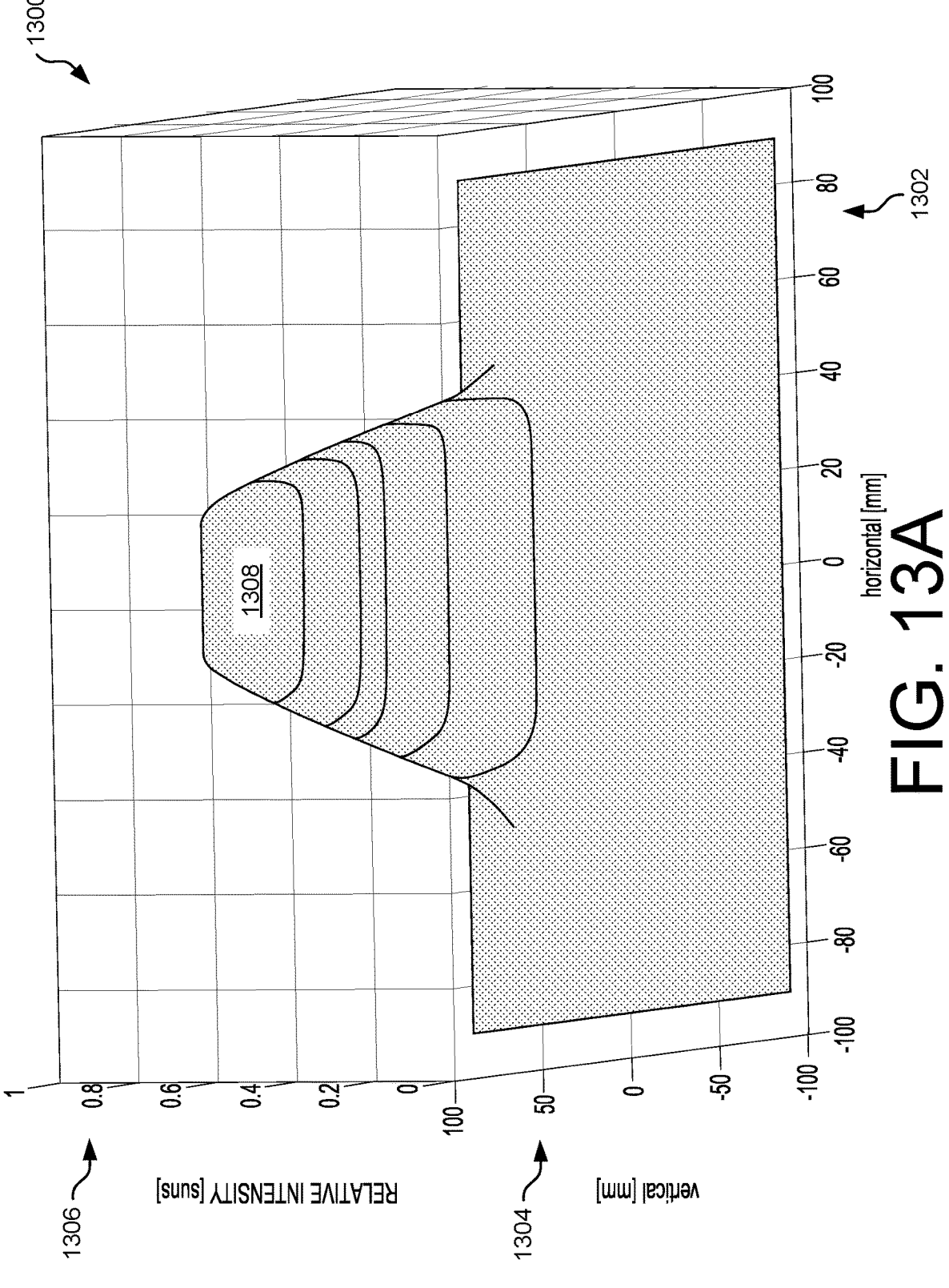
FIG. 13A illustrates a first graph showing an example intensity of light received by the solar cell of the mount of FIG. 1, according to examples of the present disclosure.
Figure 13B:
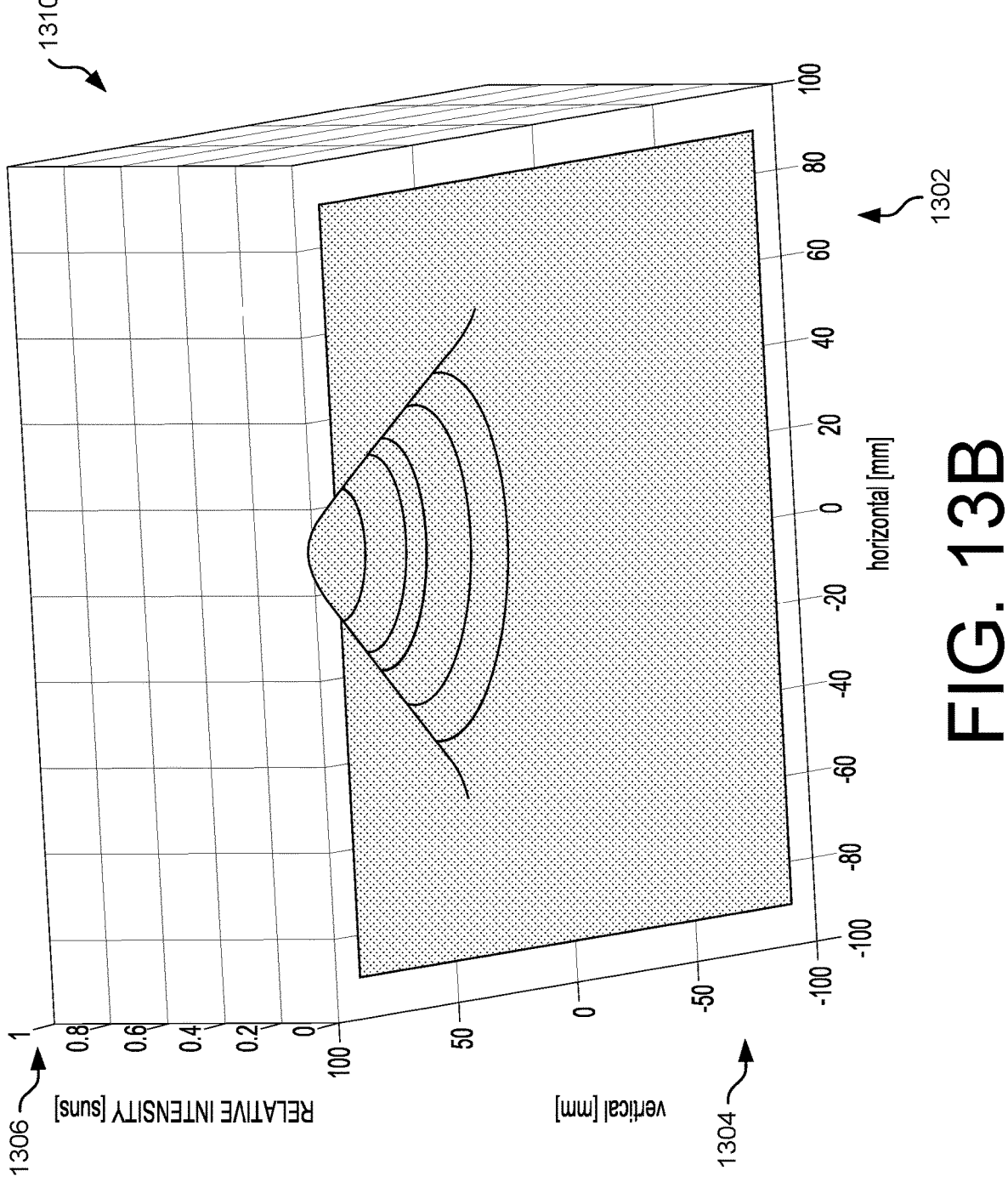
FIG. 13B illustrates a second graph showing an example intensity of light received by the solar cell of the mount of FIG. 1, according to examples of the present disclosure.

FIGS. 13A and 13B illustrate example graphs associated with an intensity of the light 104 received at various orientations of the mirror 112, according to examples of the present disclosure.

Beginning with FIG. 13A, a first graph 1300 is shown that illustrates the intensity of the light 104 along a first axis 1302 and a second axis 1304. The first axis 1302 may be a horizontal axis and the second axis may be a vertical axis. The motor(s) 304 are configured to actuate according to position the mirror 112 at the orientations along the first axis 1302 and the second axis. For example, the motor(s) 304 may actuate in a first direction (e.g., positively along the first axis 1302), a second direction (e.g., negatively along the first axis 1302), a third direction (e.g., positively along the second axis 1304), and a fourth direction (e.g., negatively along the second axis 1304). At each position, the solar relay device 102 may receive the signals 116 associated with the intensity of the light 104. As such, a dithering approach may be employed by the solar relay device 102 (e.g., move left, move right, move up, move down, etc.) for determining the associated intensities of the light 104 at each position. Accordingly, the first graph 1300 illustrates the intensity of the light 104 along a third axis 1306, at the varying positions (e.g., amount of actuation of the motor(s) 304 of the motor(s) 304 along the first axis 1302 and the second axis 1304) or orientations of the mirror 112. Using the first graph 1300, the solar relay device 102 may determine how to orient the mirror 112 (e.g., 0 mm along the first axis 1302 and 0 mm along the second axis 1304) for orienting the light 104 towards the solar cell 106.

The first graph 1300 illustrates that multiple orientations of the mirror 112 may result in the greatest intensity of the light 104 being directed towards the solar cell 106. For example, the first graph 1300 illustrates a flattened region 1308 in which the intensity of the light 104 is the greatest (e.g., 0.6 suns). The motor(s) 304 may be actuated to any of the positions along the first axis 1302 and the second axis 1304 whereby the intensity of the light 104 received from the mirror 112 is 0.6 suns, for example.

In FIG. 13B, a second graph 1310 is shown that illustrates the intensity of the light 104 along the first axis 1302 and the second axis 1304. Similar to the discussion of FIG. 13A, the motor(s) 304 are configured to actuate to position the mirror 112. Accordingly, the second graph 1310 illustrates the intensity the light 104 at the varying positions (e.g., amount of actuation of the motor(s) 304 of the motor(s) 304 along the first axis 1302 and the second axis 1304) or orientations of the mirror 112.

The second graph 1310 illustrates intensities of the light 104 that are less than those illustrated in the first graph 1300. In some instances, the mirror 112 (or the solar relay device 102) associated with the first graph 1300 may be positioned closer to the solar cell 106 in comparison to the mirror 112 (or the solar relay device 102) associated with the second graph 1310, thereby resulting in greater intensities of the light 104. For example, the mirror 112 in the first graph 1300 may be positioned one meter away from the solar cell 106, while the mirror 112 in the second graph 1310 may be posited five meters away from the solar cell 106.

FIGS. 14-18 illustrate example processes for directing light towards a solar cell of a device. The processes described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1-13B, although the processes may be implemented in a wide variety of other environments, architectures, devices, and systems.

Figure 14:
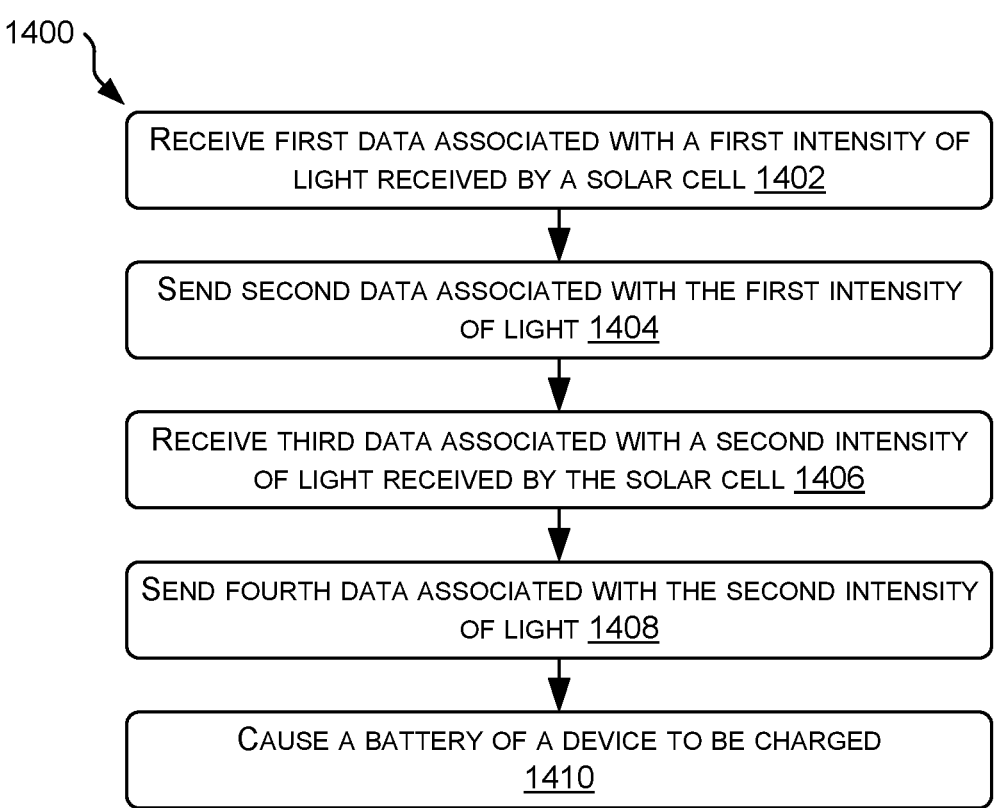
FIG. 14 illustrates an example process for transmitting an intensity of light received by a solar cell, according to examples of the present disclosure.

FIG. 14 illustrates an example process 1400 associated with the mount 108 receiving the light 104 via the mirror 112 of the solar relay device 102, and sending the signals 116 to the solar relay device 102, according to examples of the present disclosure.

At 1402, the process 1400 may include receiving first data associated with a first intensity of light received by a solar cell. For example, the mount 108 may receive data associated with an intensity of the light 104 received at, or by, the solar cell 106. In some instances, the energy harvesting circuit 208 may generate data indicative of the intensity of the light 104 (e.g., suns, luminosity, etc.). The first intensity of the light 104 may be determined, or be associated with, a first instance in time.

At 1404, the process 1400 may include sending second data associated with the first intensity of the light. For example, upon receiving the light 104, the mount 108 may send the signal 116 associated with the first intensity of the light 104. In some instances, the emitter 204 is configured to send the signal 116 based at least in part upon receiving the light 104. Moreover, the emitter 204 may be configured to send the signal 116 in instances that the intensity of the light 104 is sufficient to power the emitter 204. In addition to the signal 116 including the intensity of the light 104, the signal 116 may also include data associated with a charge of a battery of the device 110, a temperature of the mount 108 (or components thereof), a root means square value associated with the light 104 received by the solar cell 106, etc.

At 1406, the process 1400 may include receiving third data associated with a second intensity of light received by a solar cell. For example, the mount 108 may receive data associated with an intensity of the light 104 received at, or by, the solar cell 106. In some instances, the energy harvesting circuit 208 may generate data indicative of the intensity of the light 104 (e.g., suns, luminosity, etc.). The second intensity of the light 104 may be determined, or be associated with, a second instance in time that is after the first instance in time. Moreover, the second intensity of the light 104 may be greater than, equal to, or less than the first intensity of the light 104.

At 1408, the process 1400 may include sending fourth data associated with the second intensity of the light. For example, upon receiving the light 104, the mount 108 may send the signal 116 associated with the second intensity of the light 104. In some instances, the emitter 204 is configured to send the signal 116 based at least in part upon receiving the light 104. Moreover, the emitter 204 may be configured to send the signal 116 in instances that the intensity of the light 104 is sufficient to power the emitter 204. In addition to the signal 116 including the intensity of the light 104, the signal 116 may also include data associated with a charge of a battery of the device 110, a temperature of the mount 108 (or components thereof), a root means square value associated with the light received by the solar cell 106, etc.

At 1410, the process 1400 may include causing a battery of a device to be charged. For example, the electrical power generated by the solar cell 106 may be used to charge the battery of the device 110. As will be explained herein, the solar relay device 102 may utilize the second data, the fourth data, and/or additional data to orient the mirror 112 for directing the light 104 to the solar cell 106. In some instances, the contacts 702 are used to transfer the electrical power to the battery of the device 110.

Figure 15:
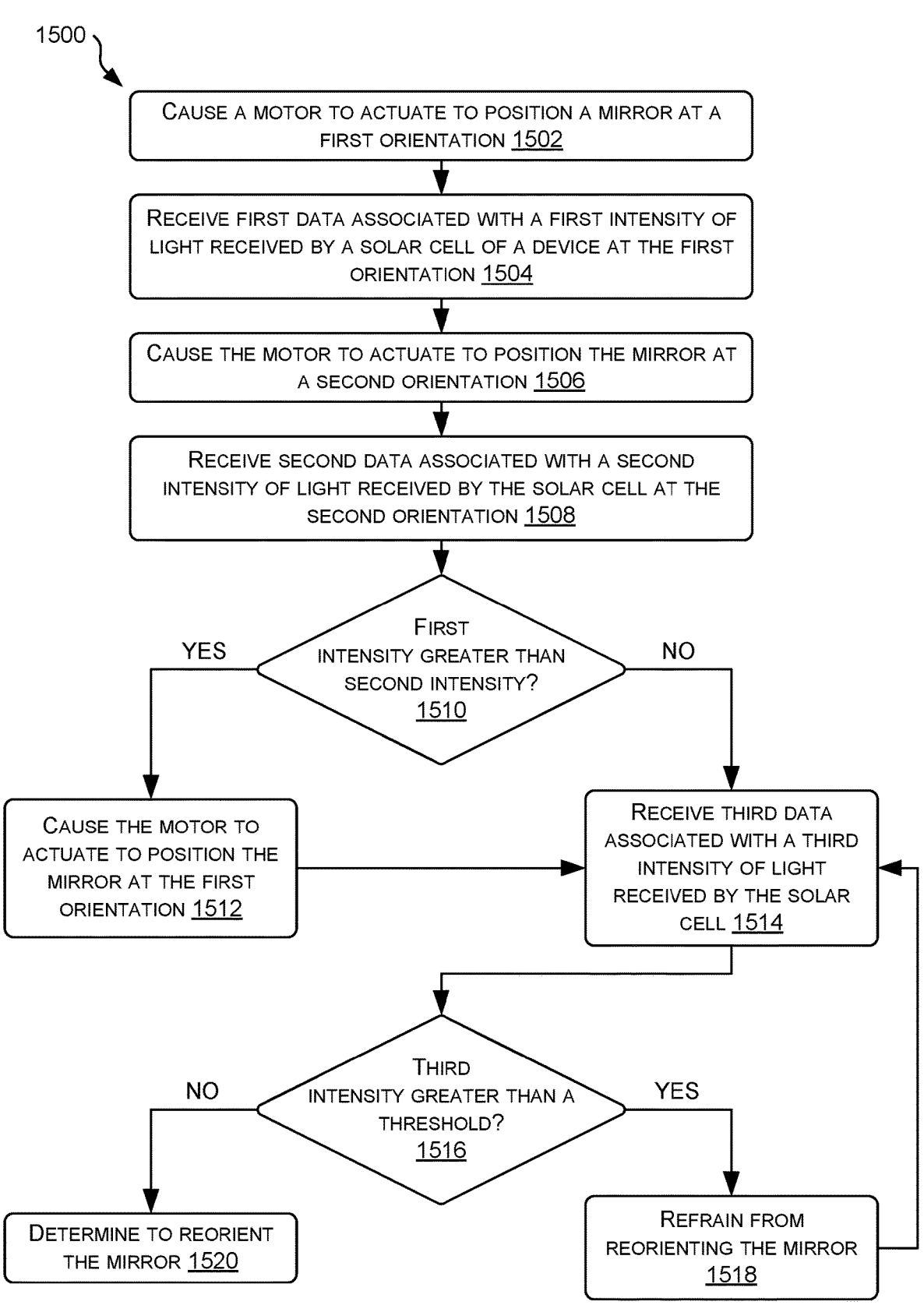
FIG. 15 illustrates an example process for orienting a mirror to charge a solar cell of a device, according to examples of the present disclosure.

FIG. 15 illustrates an example process 1500 associated with orienting the mirror 112 of the solar relay device 102 towards the solar cell 106 of the mount 108, according to examples of the present disclosure.

At 1502, the process 1500 may include causing a motor to actuate to position a mirror at a first orientation. For example, the motor(s) 304 of the solar relay device 102 may actuate to rotate the mirror 112 about one or more axes. During actuation of the motor(s) 304, the orientation of the mirror 112 correspondingly changes in an attempt to direct the light 104 to the solar cell 106. In some instances, the motor(s) 304 may actuate to position the mirror 112 at the first orientation based on a time of day, a position of the sun 114 (e.g., via an analemma), and/or weather data.

At 1504, the process 1500 may include receiving first data associated with a first intensity of light received by a solar cell of a device at the first orientation. For example, when the mirror 112 is positioned at the first orientation, the solar cell 106 of the mount 108 may receive the light 104, and generate the signal 116 for sending to the solar relay device 102 in response. Here, the signal 116 may indicate the intensity of the light 104 received, which may be used to determine where the light 104 is directed in the environment 100 (e.g., whether the light 104 is striking the solar cell 106). Such information, as discussed herein, may be used to further orient the mirror 112.

At 1506, the process 1500 may include causing a motor to actuate to position a mirror at a second orientation. For example, from the first orientation of the mirror 112, the motor(s) 304 of the solar relay device 102 may actuate to rotate the mirror 112 about one or more axes. During actuation of the motor(s) 304, the orientation of the mirror 112 correspondingly changes in an attempt to direct the light 104 to the solar cell 106. For example, the mirror 112 may be rotated at a first instance in time to the first orientation, and then at a second instance in time to the second orientation. During this process, the solar relay device 102 attempts to "find" the solar cell 106. In some instances, the motor(s) 304 may actuate to position the mirror 112 at the second orientation based on a time of day, a position of the sun 114 (e.g., via an analemma), the first orientation, and/or weather data.

At 1508, the process 1500 may include receiving second data associated with a second intensity of light received by a solar cell of a device at the second orientation. For example, when the mirror 112 is positioned at the second orientation, the solar cell 106 of the mount 108 may receive the light 104, and generate the signal 116 for sending to the solar relay device 102 in response. Here, the signal 116 may indicate the intensity of the light 104 received, which may be used to determine where the light 104 is directed in the environment 100 (e.g., whether the light 104 is striking the solar cell 106). Such information, as discussed herein, may be used to further orient the mirror 112.

At 1510, the process 1500 may include determining whether the first intensity is greater than the second intensity. For example, via comparing the intensities of the light 104, at the different orientations of the mirror 112, the solar relay device 102 may at least partially determine how, and where, to orient the mirror 112. As an example, if the first intensity of the light 104 is greater than the second intensity of the light 104, the solar relay device 102 may determine to position the mirror 112 at the first orientation, or to orient the mirror 112 similar to the first orientation to have a greater intensity of the light 104 strike the solar cell 106. If at 1510 the process 1500 determines that the first intensity of the light 104 is greater than the second intensity of the light 104, the process 1500 may follow the "YES" route and proceed to 1512. Otherwise, the process 1500 may follow the "NO" route and proceed to 1514. The process may also proceed to 1514 from 1512.

At 1512, the process 1500 may include causing the motor to position the mirror at the first orientation. For example, if the first intensity of the light 104 is greater than the second intensity of the light 104, the motor(s) 304 may actuate to position the mirror 112 at the first orientation. Comparatively, if the second intensity of the light 104 is greater than the first intensity of the light 104, being as the mirror 112 may already be positioned at the second orientation, the mirror 112 may not be adjusted.

At 1514, the process 1500 may include receiving third data associated with a third intensity of the light received by the solar cell. In some instances, the third data may be received within the signal 116 as emitted by the emitter 204. The third data may be received while the mirror 112 is at the first orientation or the second orientation. As will be explained herein, the third data may be used to determine to whether reorient the mirror 112. For example, given the movement of the sun 114 throughout the day, the first orientation or the second orientation of the mirror 112 may no longer be directing the light 104 to the mirror 112. In this sense, the signal 116 is used to continuously provide the intensity of the light 104 to the solar relay device 102 for determining whether to reorient the mirror 112.

At 1516, the process 1500 may include determining whether the third orientation is greater than a threshold. In some instances, the threshold may be associated with charging the device 110 and/or powering the mount 108. For example, at a certain intensity of the light 104 (e.g., 1.0 suns, 1.2 suns, etc.), the battery of the device 110 may be charged and the mount 108 may be powered. That is, in some instances, rather than finding the greatest intensity of the light 104 that strikes the solar cell 106, if the light 104 is sufficient to charge the battery 314 and/or power the mount 108, the solar relay device 102 may refrain from positioning the mirror 112 to other orientations. Furthermore, as noted above, throughout the day, the mirror 112 may need to be readjusted to direct the light 104 towards the solar cell 106. Determining when to reorient the mirror 112 may be based on when the intensity of the light 104 is less than the threshold. For example, after being positioned at the first orientation for a certain period of time (e.g., 30 seconds, one minute, five minutes, etc.), the mirror 112 may need to be oriented to a new orientation to direct the light 104 to the solar cell 106. If at 1516 the process 1500 determines that the third intensity is greater than the threshold, the process 1500 may follow the "YES" route and proceed to 1518.

At 1518, the process 1500 may include refraining from reorienting the mirror. For example, when the intensity of the light 104 is sufficient to charge the battery 314 and/or power the mount 108, the solar relay device 102 may refrain from positioning the mirror 112 to other orientations. From 1518, the process 1500 may proceed to 1514 whereby the solar relay device 102 may continue to receive addition data for use in determining whether to reorient the mirror 112.

Alternatively, if at 1516 the process 1500 determines that the third intensity is not greater than the threshold, the process 1500 may follow the "NO" route and proceed to 1520. At 1520 the process 1500 may include determining to reorient the mirror. For example, the mirror 112 may need to be readjusted to direct the light 104 towards the solar cell 106. In some instances, the mirror 112 may be adjusted to a third orientation, which may be based at least in part on the first orientation (e.g., the first intensity at the first orientation) and/or the second orientation (e.g., the second intensity at the second orientation).

Although the process 1500 is described as positioning the mirror 112 at two orientations, the mirror 112 may be positioned at more than two orientations to find greater intensities of the light 104 for directing to the solar cell 106. For example, the mirror 112 may be oriented to ten, twenty, fifty, or even hundreds of orientations to generate a map, graph, or other data of the intensities of the light 104 received by the solar cell 106 at the different orientations. From this data, the solar relay device 102 may determine the greatest intensity of the light 104 (or a threshold amount) received by the solar cell 106 for use in orienting the mirror 112 accordingly. Furthermore, although the process 1500 is described as receiving the data at the first orientation and the second orientation of the mirror 112, it is envisioned that at certain orientations of the mirror 112, the light 104 may not be directed to the solar cell 106. In response, the mount 108 may include insufficient light 104 to generate the signal 116 via the emitter 204. However, the lack of the signal 116 at a certain orientation of the mirror 112 may correspondingly be used to deduce an absence of the light 104 striking the solar cell 106. Such information, however, is useful in the sense of determining how to orient the mirror 112.

FIG. 16 illustrates an example process 1600 associated with orienting the mirror 112 of the solar relay device 102 towards the solar cell 106 of the mount 108, according to examples of the present disclosure.

At 1602, the process 1600 may include causing a mirror of a first device to move in a first direction to direct light towards a second device. For example, the solar relay device 102 may move the mirror 112 in a first direction (e.g., along a first axis, about a first axis, etc.) to direct the light 104 towards the solar cell 106 of the mount 108. In some instances, the mirror 112 may be moved in the first direction according to certain steps, degrees, amounts, granularity, etc.

At 1604, the process 1600 may include receiving first data associated with a first intensity of the light received by the second device as the mirror moves in the first direction. For example, as the motor(s) 304 actuate the mirror 112 in the first direction, the solar relay device 102 may receive the signals 116 from the mount 108 (e.g., the emitter 204). In some instances, the solar relay device 102 continuously receives the signals 116 as the mirror 112 moves in the first direction. As such, the solar relay device 102 may record the intensity of the light 104 with a given orientation of the mirror 112 as the mirror 112 moves in the first direction.

At 1606, the process 1600 may include causing the mirror of the first device to move in a second direction to direct light towards the second device. For example, the solar relay device 102 may move the mirror 112 in a second direction (e.g., along a second axis, about a second axis, etc.) to direct the light 104 towards the solar cell 106 of the mount 108. In some instances, the mirror 112 may be moved in the second direction according to certain steps, degrees, amounts, granularity, etc.

At 1608, the process 1600 may include receiving second data associated with a second intensity of the light received by the second device as the mirror moves in the second direction. For example, as the motor(s) 304 actuate the mirror 112 in the second direction, the solar relay device 102 may receive the signals 116 from the mount 108 (e.g., the emitter 204). In some instances, the solar relay device 102 continuously receives the signals 116 as the mirror 112 moves in the second direction. As such, the solar relay device 102 may record the intensity of the light 104 with a given orientation of the mirror 112 as the mirror 112 moves in the second direction.

At 1610, the process 1600 may include causing the mirror of the first device to move in a third direction to direct light towards the second device. For example, the solar relay device 102 may move the mirror 112 in a third direction (e.g., along a third axis, about a third axis, etc.) to direct the light 104 towards the solar cell 106 of the mount 108. In some instances, the mirror 112 may be moved in the third direction according to certain steps, degrees, amounts, granularity, etc.

At 1612, the process 1600 may include receiving third data associated with a third intensity of the light received by the second device as the mirror moves in the third direction. For example, as the motor(s) 304 actuate the mirror 112 in the third direction, the solar relay device 102 may receive the signals 116 from the mount 108 (e.g., the emitter 204). In some instances, the solar relay device 102 continuously receives the signals 116 as the mirror 112 moves in the third direction. As such, the solar relay device 102 may record the intensity of the light 104 with a given orientation of the mirror 112 as the mirror 112 moves in the third direction.

At 1614, the process 1600 may include determining an orientation of the mirror based at least in part on the first data, the second data, and/or the third data. For example, after the mirror 112 moves in the first direction, the second direction, and the third direction, the solar relay device 102 may determine the intensities of the light 104 received by the solar cell 106 at the different orientations. From this data, the solar relay device 102 may determine the greatest intensity of the light 104 (or a threshold amount of the light 104) received by the solar cell 106 for use in orienting the mirror 112 accordingly. That is, after performing a searching sequence, and mapping the intensities of the light 104 with the orientations of the mirror 112, the solar relay device 102 may select an orientation that results in the greatest intensity of the light 104 striking the mirror 112.

Figures 17, 18:
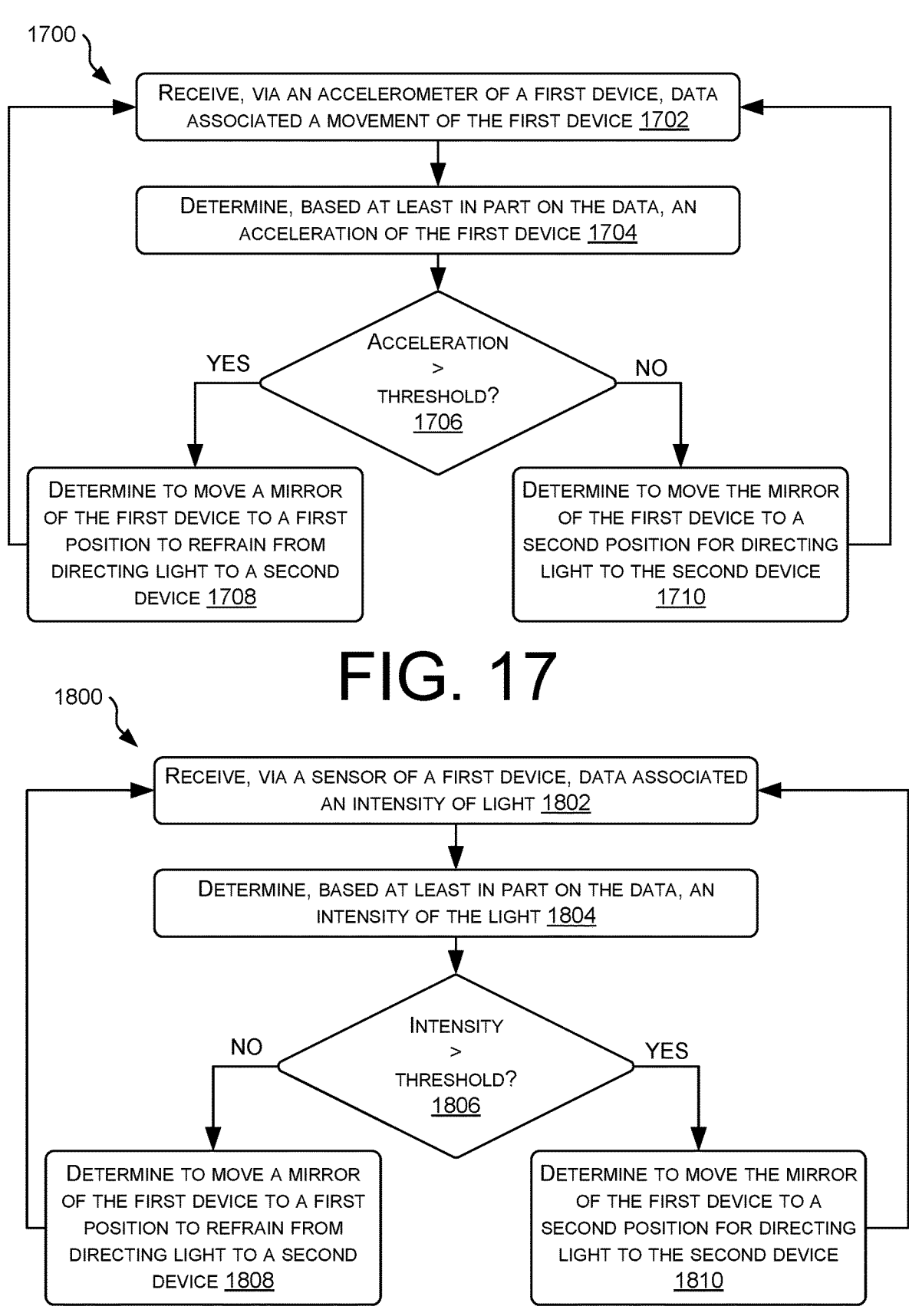
FIG. 17 illustrates an example process for determining an acceleration experienced by a solar relay device for determining whether to direct a mirror of the solar relay device, according to examples of the present disclosure.
FIG. 18 illustrates an example process for determining an intensity of light received by a solar relay device for determining whether to direct a mirror of the solar relay device, according to examples of the present disclosure.

FIG. 17 illustrates an example process 1700 associated with utilizing an acceleration experienced by the solar relay device 102 when determining whether to direct the light 104 towards the solar cell 106, according to examples of the present disclosure.

At 1702, the process 1700 may include receiving, via an accelerometer of a first device, data associated with a movement of the first device. For example, the solar relay device 102 may receive the sensor data 318 generated via an accelerometer of the solar relay device 102. In some instances, the sensor data 318 may be received prior to the solar relay device 102 orienting the mirror 112 towards the solar cell 106, or while the mirror 112 is oriented to direct the light 104 towards the solar cell 106. In such instances, the solar relay device 102 may continuously receive the sensor data 318 throughout the day, or while the mirror 112 is directing the light 104 towards the solar cell 106. In some instances, the sensor data 318 may be received according to predetermined schedules (e.g., every second, every minute, every hour, etc.).

At 1704, the process 1700 may include determining, based at least in part on the data, an acceleration of the first device. For example, utilizing the sensor data 318, the solar relay device 102 may determine an acceleration experienced by the solar relay device 102. In some instances, the acceleration may be along individual axes (e.g., X, Y, and/or Z-axis). Additionally, the acceleration may be average along each axes (e.g., individually), or the accelerations along the axes may be average (e.g., collectively).

At 1706, the process 1700 may include determining whether the acceleration is greater than a threshold. For example, using the acceleration, the solar relay device 102 may compare the acceleration to a threshold. In some instances, the threshold may be determined based at least in part on a variation in acceleration (e.g., 10%, 20%, or 30% variation), a variation or fluctuation in light intensity, etc. In some instances, the acceleration along each of the axes are compared to respective thresholds, or a summed acceleration along the axes is compared to a single threshold. If at 1706 the process 1700 determines that the acceleration is greater than the threshold, the process 1700 may follow the "YES" route and proceed to 1708.

At 1708, the process 1700 may include determining to move a mirror of the first device to a first position to refrain from directing light to a second device. For example, when the acceleration is greater than the threshold, the solar relay device 102 may refrain from orienting the mirror 112 to direct the light to the solar cell 106. As an example, during windy conditions, the mirror 112 may move and the light 104 may scatter within the environment 100. In such instances, the light 104 may not be consistently directed towards the solar cell 106. Moreover, during such instances and during possible shaking of the solar relay device 102, the light 104 may be directed towards the imaging sensor(s) and/or the PIR sensor(s), thereby negatively affecting motion sensing. Accordingly, to avoid these situations, if the accelerations experienced by the solar relay device 102 are greater than the threshold, the solar relay device 102 may refrain from orienting the mirror 112 to reflect the light 104 to the solar cell 106.

In some instances, moving the mirror 112 to the first position may be associated with solar cell 312 being directed towards the sun 114. For example, the solar cell 312 of the solar relay device 102 may utilize the light 104 for charging the battery 314. In this manner, although the light 104 is not reflected towards the solar cell 106, the solar cell 312 of the solar relay device 102 may instead utilize the light 104 for charging the battery 314. In some instances, the solar relay device 102 may orient the solar cell 312 via the motor(s) 304, and via receiving feedback from the solar cell 312 associated with the intensity of the light 104 received via the solar cell 312. From 1708, the process 1700 may loop to 1702, whereby the solar relay device 102 may receive additional sensor data 318 for determining whether to direct the light 104 towards the solar cell 106.

Returning to 1706, if the process 1700 determines that the acceleration is less than the threshold, the process 1700 may follow the "NO" route and proceed to 1710. At 1710, the process 1700 may include determining to move the mirror of the first device to a second position for directing light to the second device. For example, if the solar relay device 102 is not experiencing accelerations greater than the threshold, the solar relay device 102 may determine orient the mirror 112 to direct the light 104 towards the solar cell 106. That is, if the solar relay device 102 is able to accurately direct the light 104 towards the solar cell 106, the solar relay device 102 may do so. Accordingly, the solar relay device 102 may orient the mirror 112 via the motor(s) 304 to direct the light 104 towards the solar cell 106. From 1710, the process 1700 may loop to 1702 to receive additional sensor data 318 for determining whether to continue or refrain from orienting the mirror towards the solar cell 106.

In some instances, the process 1700 may utilize weather data for determining whether to orient the mirror 112 towards the solar cell 106. For example, if the weather data indicates that the forecast is windy, or that winds are above a certain threshold (e.g., 20 mph), the solar relay device 102 may refrain from orienting the mirror 112 to direct the light 104 to the solar cell 106.

FIG. 18 illustrates an example process 1800 associated with utilizing an intensity of light received at or by the solar relay device 102 when determining whether to direct the light 104 towards the solar cell 106, according to examples of the present disclosure.

At 1802, the process 1800 may include receiving, via a sensor of a first device, data associated with an intensity of light. For example, the solar relay device 102 may receive the sensor data 318 generated via a light sensor of the solar relay device 102. In some instances, the sensor data 318 may be received prior to the solar relay device 102 orienting the mirror 112 towards the solar cell 106, or while the mirror 112 is oriented to direct the light 104 towards the solar cell 106. In such instances, the solar relay device 102 may continuously receive the sensor data 318 throughout the day, or while the mirror 112 is directing the light 104 towards the solar cell 106. In some instances, the sensor data 318 may be received according to predetermined schedules (e.g., every second, every minute, every hour, etc.).

At 1804, the process 1800 may include determining, based at least in part on the data, an intensity of the light. For example, utilizing the sensor data 318, the solar relay device 102 may determine an intensity of the light 104 (e.g., lumens, suns, etc.) received at or by the solar relay device 102.

At 1806, the process 1800 may include determining whether the intensity is greater than a threshold. For example, using the intensity of the light 104, the solar relay device 102 may compare the intensity to a threshold. In some instances, the threshold may be determined based at least in part on a variation in solar intensity (e.g., over a certain period of time), or an amount of solar intensity (e.g., 1 klux, 10 klux, etc.). For example, if the intensity is less than the threshold, the intensity of the light 104 (or the amount) may be insufficient to charge the battery of the device 110. If at 1806 the process 1800 determines that the acceleration is not greater than the threshold, the process 1800 may follow the "NO" route and proceed to 1808.

At 1808, the process 1800 may include determining to move a mirror of the first device to a first position to refrain from directing light to a second device. For example, when the intensity is not greater than the threshold, the solar relay device 102 may refrain from orienting the mirror 112 to direct the light 104 to the solar cell 106. As an example, during overcast conditions (e.g., snowing, raining, foggy, cloudy, etc.), the intensity or amount the light 104 capable of being directed to the solar cell 106 may be inadequate. Additionally, during overcast conditions within the environment 100, the fog, snow, etc. may cause the light 104 to scatter within the environment 100. In such instances, the light 104 may not consistently be directed towards the solar cell 106. In some instances, moving the mirror 112 to the first position may be associated with solar cell 312 being directed towards the sun. For example, the solar cell 312 of the solar relay device 102 may utilize the light 104 for charging the battery 314. In this manner, although the light 104 is not reflected towards the solar cell 106, the solar cell 312 of the solar relay device 102 may instead utilize the light 104 for charging the battery 314. In some instances, the solar relay device 102 may orient the solar cell 312 via the motor(s) 304, and via receiving feedback from the solar cell 312 associated with the intensity of the light 104 received via the solar cell 312. From 1808, the process 1800 may loop to 1802, whereby the solar relay device 102 may receive additional sensor data 318 for determining whether to direct the light 104 towards the solar cell 106.

Returning to 1808, if the process 1700 determines that the acceleration is greater than the threshold, the process 1800 may follow the "YES" route and proceed to 1810. At 1810, the process 1700 may include determining to move the mirror of the first device to a second position for directing light to the second device. For example, if the solar relay device 102 measures that the intensity of the light is greater than the threshold, the solar relay device 102 may determine orient the mirror 112 to direct the light 104 towards the solar cell 106. That is, if the solar relay device 102 is able to direct a sufficient amount of the light 104 to charge the battery of the device, the solar relay device 102 may do so. Accordingly, the solar relay device 102 may orient the mirror 112 via the motor(s) 304 to direct the light 104 towards the solar cell 106. From 1810, the process 1800 may loop to 1802 to receive additional sensor data 318 for determining whether to continue or refrain from orienting the mirror towards the solar cell 106.

In some instances, the process 1800 may utilize weather data for determining whether to orient the mirror 112 towards the solar cell 106. For example, if the weather data indicates that the forecast is overcast, raining, foggy, etc., the solar relay device 102 may refrain from orienting the mirror 112 to direct the light 104 to the solar cell 106.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A first device comprising:
   a solar cell;
   a mirror;
   one or more motors configured to adjust an orientation of the mirror;
   a receiver;
   one or more processors; and
   one or more non-transitory computer-readable media storing computer-executable instructions that, when executed by the one or more processors, cause the one or more processors to perform operations comprising:
   causing the one or more motors to actuate the mirror to a first orientation,
   receiving, using the receiver, a first signal transmitted by a second device, the first signal representing first data indicating light intensity at the second device,
   causing the one or more motors to actuate the mirror to a second orientation,
   receiving, using the receiver, a second signal transmitted by the second device, the second signal representing second data indicating the light intensity at the second device, and
   causing the one or more motors to actuate the mirror to a third orientation.

2. The first device of claim 1, further comprising a visible-light blocking film disposed at least partially over the mirror.

3. The first device of claim 1, wherein the first signal and the second signal represent infrared (IR) light emitted via an IR emitter of the second device.

4. The first device of claim 1, wherein the one or more non-transitory computer-readable media store computer-executable instructions that, when executed by the one or more processors, cause the one or more processors to perform operations comprising:
   receiving a third signal transmitted by the second device, the third signal representing third data indicating the light intensity at the second device; and
   causing, based on the first data, the second data, and the third data, the one or more motors to actuate the mirror to a fourth orientation.

5. The first device of claim 1, wherein causing the one or more motors to actuate the mirror to the third orientation is based on the first data and the second data.

6. The first device of claim 1, further comprising a sensor, wherein the one or more non-transitory computer-readable media store computer-executable instructions that, when executed by the one or more processors, cause the one or more processors to perform operations comprising:
   receiving, from the sensor, sensor data;
   determining, based at least in part on the sensor data, at least one of:
      an acceleration experienced by the first device, or
      a variation of light within an environment of the first device; and
   causing, based at least in part on the at least one of the acceleration or the variation of light, the one or more motors to actuate the mirror to a fourth orientation associated with refraining from directing the light to the second device.

7. The first device of claim 1, wherein the one or more motors are configured to adjust the orientation of the mirror about one or more axes.

8. The first device of claim 1, further comprising at least one of a bracket, stake, or clamp for securing the first device within an environment.

9. The first device of claim 1, wherein the first device comprises a light emitting element and a motion sensor, wherein the first device is configured to emit light using the light emitting element in response to detection of motion by the motion sensor.

10. The first device of claim 1, wherein the first device comprises a light emitting element and a passive infrared sensor.

11. A first device comprising:

a base;

an emitter;

a mounting portion;

a solar cell positioned between the base and the mounting portion;

one or more processors; and one or more non-transitory computer-readable media storing computer-executable instructions that, when executed by the one or more processors, cause the one or more processors to perform operations comprising:

determining first data representing a first light intensity value for the solar cell, transmitting, using the emitter, the first data to a second device comprising a mirror configured to direct light toward the solar cell, determining second data representing a second light intensity value for the solar cell, and transmitting, using the emitter, the second data to the second device.

12. The first device of claim 11, wherein the first device includes one or more connections for coupling to a battery of a second device so as to enable electrical energy generated by the solar cell to be used to charge the battery of the second device.

13. The first device of claim 11, wherein the mounting portion comprises a mounting face including one or more mounting elements.

14. The first device of claim 11, wherein the mounting portion comprises a receptacle adapted to receive a second device.

15. The first device of claim 11, wherein the one or more non-transitory computer-readable media store computer-executable instructions that, when executed by the one or more processors, cause the one or more processors to perform operations comprising:

determining, based on the first data and the second data, third data representing a mean value, and transmitting, using the emitter, the third data.

16. The first device of claim 11, wherein the one or more non-transitory computer-readable media store computer-executable instructions that, when executed by the one or more processors, cause the one or more processors to perform operations comprising:

determining, based on the first data and the second data, third data representing a root mean square value, and transmitting, using the emitter, the third data.

17. The first device of claim 11, wherein the one or more non-transitory computer-readable media store computer-executable instructions that, when executed by the one or more processors, cause the one or more processors to perform operations comprising:

determining third data corresponding to a charge level of a battery; and transmitting, using the emitter, the third data.

18. The first device of claim 11, wherein the one or more non-transitory computer-readable media store computer-executable instructions that, when executed by the one or more processors, cause the one or more processors to perform operations comprising:

determining third data corresponding to a temperature; and transmitting, using the emitter, the third data.

19. The first device of claim 11, wherein the one or more non-transitory computer-readable media store computer-executable instructions that, when executed by the one or more processors, cause the one or more processors to perform operations comprising determining, based on a determined power level, a transmission frequency, and wherein the second data is transmitted based on the determined transmission frequency.

20. The first device of claim 11, wherein the one or more non-transitory computer-readable media store computer-executable instructions that, when executed by the one or more processors, cause the one or more processors to perform operations comprising determining, based on a light intensity level, a transmission frequency, and wherein the second data is transmitted based on the determined transmission frequency.

21. The first device of claim 11, wherein the solar cell is arranged such that, when the first device is oriented in a first orientation with the base pointed downwards, the solar cell is oriented downward.

22. A method comprising:

determining, at a first electronic device having a camera device mounted thereto, a first intensity value based on light received at a solar cell of the first electronic device;

transmitting, by an infrared (IR) emitter of the first electronic device, a first signal representing first data indicating the first intensity value;

receiving, by an IR receiver of a second electronic device, the first signal;

determining, by the second electronic device based on receiving the first signal, the first data indicating the first intensity value; and adjusting, based on the receiving the first signal and using a motor of the second electronic device, an orientation of a mirror of the second electronic device.

23. The method of claim 22, further comprising:

determining, at the first electronic device, a second intensity value based on light received at the solar cell of the first electronic device; and transmitting, by the IR emitter of the first electronic device, a second signal representing second data indicating the second intensity value, wherein adjusting the orientation of the mirror is based on the first data and the second data.

24. The method of claim 22, wherein the camera device comprises a video doorbell device.

25. The method of claim 22, wherein the second electronic device comprises a pathlight device.

* * * * *